(12) United States Patent
Kocher

(10) Patent No.: US 8,272,601 B2
(45) Date of Patent: Sep. 25, 2012

(54) MULTI-PURPOSE GRILL STAND

(76) Inventor: Charles Kocher, Newton, MA (US)

( * ) Notice: Subject to any disclaimer, the term of this patent is extended or adjusted under 35 U.S.C. 154(b) by 346 days.

(21) Appl. No.: 12/584,683

(22) Filed: Sep. 10, 2009

(65) Prior Publication Data

US 2010/0294907 A1 Nov. 25, 2010

Related U.S. Application Data

(60) Provisional application No. 61/191,523, filed on Sep. 10, 2008.

(51) Int. Cl.
*F16L 3/00* (2006.01)
(52) U.S. Cl. .................... 248/121; 248/37.3; 248/176.1; 126/30
(58) Field of Classification Search .............. 248/37.3, 248/37.6, 121, 122.1, 514, 515, 516, 535, 248/215, 124.1, 176.1, 528; 126/29, 40, 126/33, 298, 25 A, 9 B, 30
See application file for complete search history.

(56) References Cited

U.S. PATENT DOCUMENTS

| | | | | |
|---|---|---|---|---|
| 50,261 A * | 10/1865 | Minor | | 248/514 |
| 110,434 A * | 12/1870 | Clarke's | | 248/515 |
| 116,157 A * | 6/1871 | Child | | 248/515 |
| 358,527 A * | 3/1887 | Zwoyer et al. | | 248/514 |
| 388,433 A * | 8/1888 | Meisselbach | | 248/516 |
| 417,997 A * | 12/1889 | Dupuis | | 248/535 |
| 699,066 A * | 4/1902 | Baskett | | 248/124.1 |
| 758,015 A * | 4/1904 | Miller | | 248/125.3 |
| 1,045,583 A * | 11/1912 | Mills | | 211/85.6 |
| 1,175,278 A * | 3/1916 | Livermore | | 248/121 |
| 1,452,640 A * | 4/1923 | Hulick | | 248/121 |
| 1,570,657 A * | 1/1926 | White et al. | | 248/122.1 |
| 2,173,024 A * | 9/1939 | Park | | 126/30 |
| 2,301,885 A * | 11/1942 | Lachr | | 248/515 |
| 2,366,950 A * | 1/1945 | Wright | | 248/122.1 |
| 2,472,059 A * | 6/1949 | Arwood | | 248/515 |
| 2,519,612 A * | 8/1950 | Tuttle | | 248/530 |
| 2,522,223 A * | 9/1950 | Hardin et al. | | 248/124.2 |
| 2,530,265 A * | 11/1950 | Phalen | | 248/514 |
| 2,645,439 A * | 7/1953 | Gauthier | | 248/513 |
| 2,698,726 A * | 1/1955 | Howe | | 248/528 |
| 3,162,113 A * | 12/1964 | Tallaksen | | 99/446 |
| 4,083,354 A * | 4/1978 | Claire et al. | | 126/30 |
| 4,351,312 A * | 9/1982 | Ivy | | 126/30 |
| 4,437,450 A * | 3/1984 | Connelly | | 126/30 |
| D279,644 S * | 7/1985 | Schoonmaker | | D7/336 |
| 4,553,525 A * | 11/1985 | Ruble | | 126/30 |
| 4,607,608 A * | 8/1986 | Allred et al. | | 126/30 |
| 5,307,797 A * | 5/1994 | Kleefeld | | 126/30 |
| 5,819,718 A * | 10/1998 | Leiser | | 126/30 |
| 5,848,584 A * | 12/1998 | Brog | | 126/30 |
| 6,584,967 B1 * | 7/2003 | Paumen et al. | | 126/30 |
| 7,080,811 B2 * | 7/2006 | Thompson | | 248/156 |
| 2005/0035249 A1 * | 2/2005 | Busuito | | 248/215 |
| 2007/0289587 A1 * | 12/2007 | Eckes | | 126/30 |

* cited by examiner

*Primary Examiner* — Kimberly Wood
(74) *Attorney, Agent, or Firm* — William Nitkin

(57) ABSTRACT

A cooking utensil support apparatus used for the cooking of food in a cooking utensil over a heat source, such support apparatus having stand and a cooking utensil handle support member adjustably positioned on such stand with angle adjustment means for adjusting the angle of the cooking utensil handle support member and the handle supported therein of such cooking utensil.

10 Claims, 21 Drawing Sheets

SECTION A-A

Section D-D

Section F-F

MULTI-PURPOSE GRILL STAND

This application claims priority and benefit of a provisional patent application entitled Multi-purpose Grill Stand, Application No. 61/191,523 filed Sep. 10, 2008, now pending.

FIELD OF INVENTION

This invention relates to a grilling and cooking vessel support apparatus to be used with an open fire source, such as an indoor or outdoor fireplace, cooking hearth, woodstove, fire-ring or fire-pit, camp or beach fire, park and camping grills and the like and more particularly to a freestanding portable, moveable and foldable grilling and cooking vessel support apparatus that is fully adjustable horizontally, vertically, laterally, transversely and pivotally in the vertical and horizontal plane with respect to the hearth, and more particularly to a freestanding, portable and foldable grilling and cooking vessel support apparatus that offers a fully adjustable support mechanism in order to receive, support and balance a wide variety of store-bought or custom-made cooking, grilling, roasting and smoking vessels, utensils, devices and the like.

BACKGROUND OF THE INVENTION

Various forms of cooking vessel support assemblies for campfire and fireplace cooking are known in the prior art. Some are mounted stationary to the ground or hearth, while others allow limited lateral movement. Typical of the prior art is D279,644 by Schoonmaker entitle Stand for supporting an elevated Grill. Prior art supports utilize an arm extending laterally from a vertical support member. In some applications the free end of the arm has a single cooking vessel permanently attached to it and is limited to a rotation in a horizontal plane around the vertical axis of the vertical support member and to a vertical height adjustment limited by notches, ring or screw assemblies along the vertical member. These permanently attached cooking vessels and grills offer limited versatility due to their size, configuration, lack of mobility and fixed angle in relation to the hearth. These single-use cooking vessel support assemblies deny the cook the versatility of utilizing a variety of other custom-made or readily available store-bought cooking vessels and utensils. It is generally not possible to easily remove and carry such cooking vessels, as shown in prior art, to offer cooked food to guests, or to carry such vessels to the table for serving. Some of the support assemblies shown in the prior art are heavy and bulky and not suitable for easy transport and storage.

SUMMARY OF THE INVENTION

It is an object of this invention to provide a grilling and cooking vessel support apparatus that is constructed in such a way that it can be utilized with and support a wide variety of store-bought and custom-made grilling and cooking vessels and devices, such as gridirons, grills, grill baskets, fish baskets, perforated roasting pans, grill pans, sauté pans, griddles, popcorn toasters, shish-kabob holders, rotisseries, hang bars for kettles, Dutch ovens and other food support devices and the like, and more particularly to provide a freestanding portable and foldable grilling and cooking vessel support apparatus having a cooking vessel handle support mechanism that can be adjusted to readily accommodate different-sized handles, grips, support bars and other holding devices and the like, of the grilling and cooking vessels and cooking vessel holding devices. The term "cooking utensil" as used and defined herein refers to any vessel, grill or implement for cooking use that can be supported by the apparatus of this invention including, but not limited to, the grilling and cooking vessels described above. While the specification herein generally refers to "cooking vessel," it should be understood that "cooking vessel" includes any type of cooking utensil.

It is also an object of this invention to provide an adjustable cooking vessel handle support mechanism that can accommodate and be adapted to different angles and configurations of handles and support bars in their relation to the horizontal plane of the cooking surfaces of the cooking, grilling and roasting vessels and devices. This manual adjustment mechanism allows the cook to align the horizontal plane of the cooking surfaces to a level that is perpendicular to the vertical forces of gravity, thus keeping the food balanced on an even plane in relation to the hearth and preventing it from rolling off the cooking surface.

A further object of the invention is to provide a cooking vessel support apparatus that can support a plurality of cooking vessel handle support mechanisms in order to allow the cook to position the cooking vessel handle support mechanisms with their respective supported cooking vessels infinitely adjustable along the vertical central post, to a selected height of a plurality of different heights with respect to the hearth in order to simultaneously expose different foods to different cooking temperatures so that said foods can be either fast-cooked, slow-cooked or just kept warm until ready to be served.

A still further object of the invention is to provide a cooking vessel support apparatus that allows the cook to move the cooking vessels with one hand laterally from side to side, laterally pivotal around a vertical axis and transversely from front to back to a desired position over the heat source in order to expose the foods to the most appropriate cooking temperatures.

A further object of the invention is to provide a cooking vessel support apparatus that is constructed in a solid and sturdy way to allow the cook to freely move about the entire fully assembled cooking vessel support apparatus independently within, near or away from the heat source in order to utilize optimum cooking temperatures.

It is a further object of this invention to allow the user the ability to utilize the versatility of the laterally extending support feet which are of low profile construction and pivotally adjustable to be positioned in a radial spread apart configuration. This configuration of the support feet allows the cook to adjust the support feet in such ways as to fit under andirons, fire logs, fire bricks and other obstructions or to move the support feet into different positions within or around the heat source, or to adjust the support feet to fit the under woodstoves, in pizza ovens, fire rings, campfires, beach fires or any other heat source desired. A further object of the invention is to provide a cooking vessel support apparatus that allows the cook to easily flip, adjust, remove and replace the cooking vessels from the cooking vessel handle support mechanisms with one hand, without disturbing or moving the cooking vessel support apparatus from its position in relation to the heat source, thus allowing the cook to easily inspect, baste and season selected food-items, and if necessary remove, turn, re-arrange and re-position such items for additional cooking.

An additional object of the invention is to give the cook the option to remove the cooking vessel from the cooking vessel support apparatus with one hand, in order to offer cooked foods to the guests or to carrying the entire cooking vessel, loaded with the cooked food, directly to the table.

A further object of the invention is to provide a cooking vessel support apparatus that is inexpensive to manufacture, effective in use and of simple, durable and robust construction.

A further object of the invention is to provide a cooking vessel support apparatus that can easily be folded flat, with or without disassembling, for cooling, cleaning, storage or transportation.

The device of this invention is an open-fire cooking vessel support apparatus, consisting of a slightly inclined vertical central post, a plurality of laterally extending support feet and one or more fully adjustable cooking vessel handle support mechanisms, with attachments and accessories.

The open-fire cooking vessel support apparatus including the cooking vessel handle supporting mechanism can be constructed from different materials including, but not limited to, stainless steel, hot-rolled or cold-rolled steel, iron, cast iron, brass, copper, aluminum and other heat-tolerant materials The materials of the members of the cooking vessel support apparatus, including the vertical central post, the adjustable and foldable support feet and the cooking vessel handle support mechanisms can be constructed from different shapes of material configurations and dimensions, such as, but not limited to, solid or tubular flat bar stock, solid or tubular round bar stock, solid or tubular square bar stock, and other solid or tubular shapes such as angle-shaped, U-shaped, I-shaped, multi-sided shapes or custom-designed shapes. A solid flat bar stock with an approximate six to one ratio with respect to thickness and width is preferred as shown.

The vertical central post and the support feet can be connected in different ways including, but not limited to, riveting, soldering or welding process, bolting, forging, screwing or can be of a one-piece construction. A one-piece construction between the vertical central post and one of the support feet is preferred as shown, which includes but is not limited to an approximately 45 degree twist at the lower end of the vertical central post and an approximately 90 degree bend between the lower end of the vertical central post and the support foot.

A second or a plurality of moveable support feet can be connected to the lower end of the vertical central post or to an existing support foot in different ways including, but not limited to, riveting, soldering or welding process, bolting, forging, screwing and the like. A second support foot bolted to the preferred support foot which is part of the one-piece construction between the vertical central post and one of the support feet is preferred as shown. While any suitable number of support feet can be employed, two support feet are preferred as shown.

The basic body of the cooking vessel handle support mechanism can be constructed of, but is not limited to, the different materials as mentioned above, and different shapes, configurations and dimensions of the materials. A solid flat bar stock with an approximate six to one ratio with respect to thickness and width is preferred as shown.

The main body of the cooking vessel handle support mechanism can be constructed of, but not limited to, a U-shaped configuration where the two long ends of the U-shaped configuration are parallel and symmetrical with the two wider dimensions of the flat bar stock facing each other. The U-shaped configuration of the cooking vessel handle support mechanism can be achieved, but is not limited to, by bending a piece of flat bar stock at its midpoint by 180 degrees or by connecting two parallel pieces of flat bar stock with an end cap or spacer block, possibly using a welding, soldering, bolting or riveting process. The distance between the two parallel members is slightly greater than the thickness of the vertical central post so that the central post can receive the cooking vessel handle support mechanism. This sliding cooking vessel handle support mechanism has a primary locking device to allow or prevent the device from sliding along the vertical central post, or being locked at any desired vertical position along said post. This primary locking device provides a clamping mechanism such as, but is not limited to, a spring-loaded locking device, a threaded thumb screw or screw device, a threaded and bent handlebar or any other suitable locking device. The cooking vessel handle support mechanism also provides a rest and holding mechanism for a wide variety of cooking vessels, their handles, support bars and accessories. This holding mechanism is comprised of two parallel, rigidly mounted, support pins which extend laterally in a horizontal plane from one side of the cooking vessel handle support mechanism. These pins are spaced in such a manner that allows a cooking vessel to be supported in a cantilever manner This configuration allows the back end part of the cooking vessel handle to be slipped under the rear-positioned support pin and the front part of the handle to be positioned over the front-positioned support pin, thus suspending the cooking vessel by its handle in a cantilever manner over the heat source. The weight of the main component of the cooking vessel, mounted in this cantilever manner, applies a forward and downward rotating torque to said cooking vessel handle support mechanism, thus frictionally engaging parts of the cooking vessel handle support mechanism with the surface of the upright central post, consequently locking the cooking vessel handle support mechanism securely to the upright central post, creating a secondary frictional locking mechanism. The design with respect to position and length and construction of the two support pins, allows the cook to easily adjust the cooking vessel laterally pivotal around a vertical axis and transversely from front to back over the heat source. Each support pin has a slight upward and a downward bend, respectively, on its first and $2^{nd}$ ends, to prevent the cooking vessel handle from accidently sliding off the cooking vessel handle support mechanism support pins.

The present invention has other features, objects and advantages which will become more clearly apparent in connection with the following detailed description of a preferred embodiment, taken in conjunction with the appended drawings.

DESCRIPTION OF THE PREFERRED EMBODIMENT(S)

Figure 1:
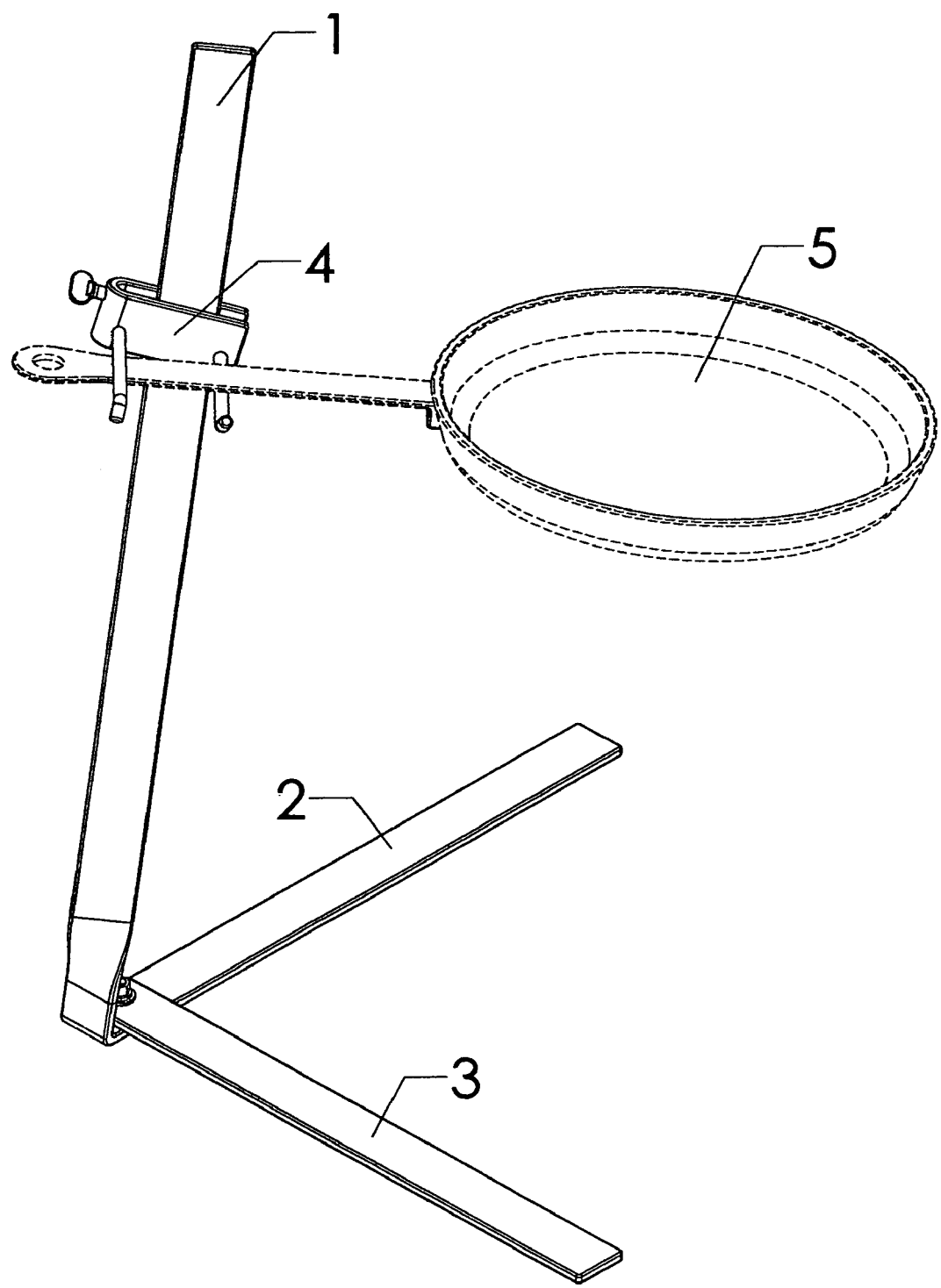
FIG. 1 illustrates a perspective view of the portable and foldable grilling and cooking vessel support apparatus of this invention that is constructed and assembled in accordance with the present invention showing an attached cooking vessel in dashed lines that is not part of the invention.
Figure 2:
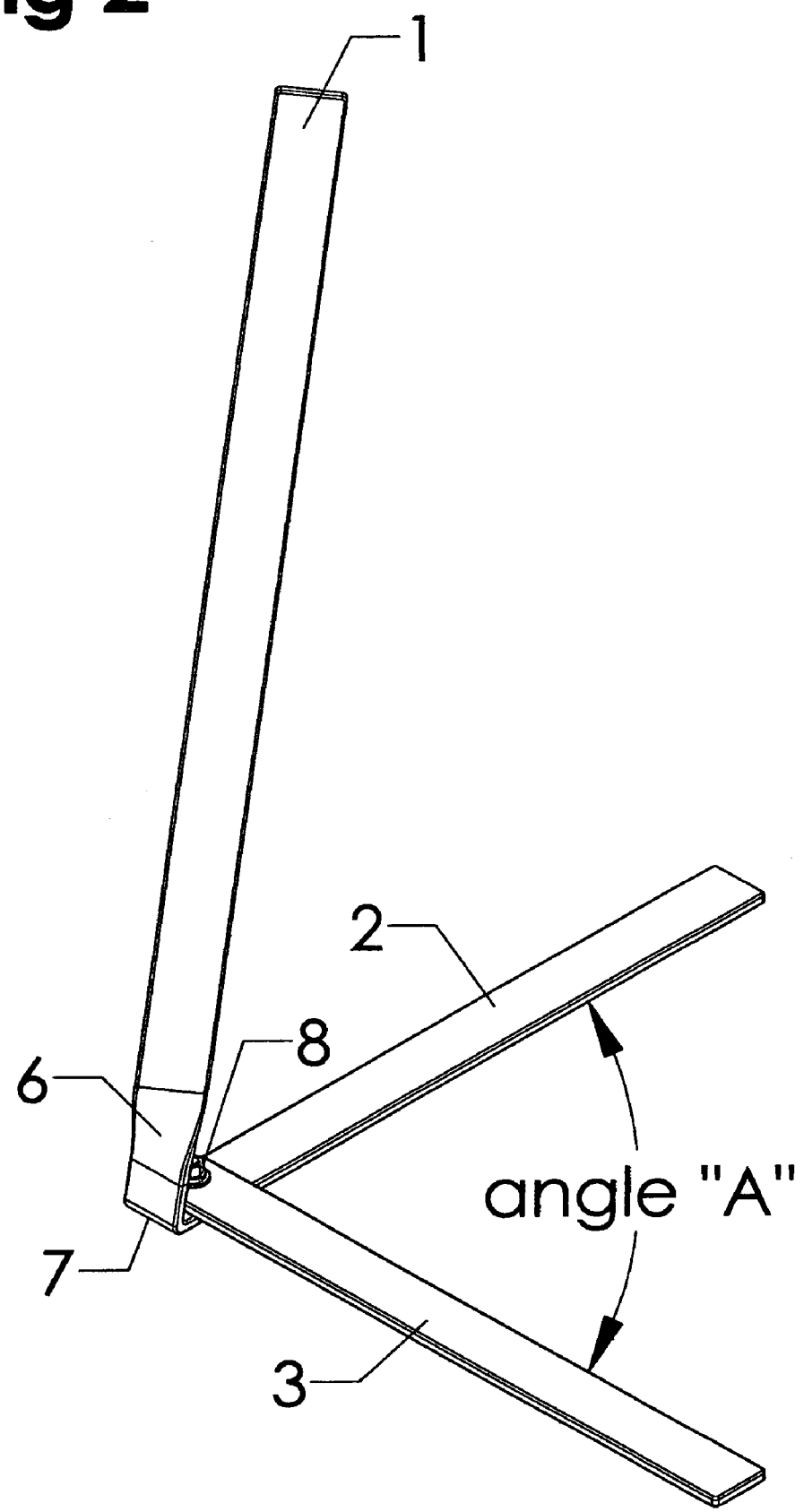
FIG. 2 illustrates a perspective view of the vertical central post and support feet assembly, including an approximately 45 degree twist at the lower extremity of the vertical central post, an approximately 90 degree bend between the vertical central post and the stationary support foot, the adjustable support foot, the fastening components and an illustration of the variable angle "A".
Figure 11:
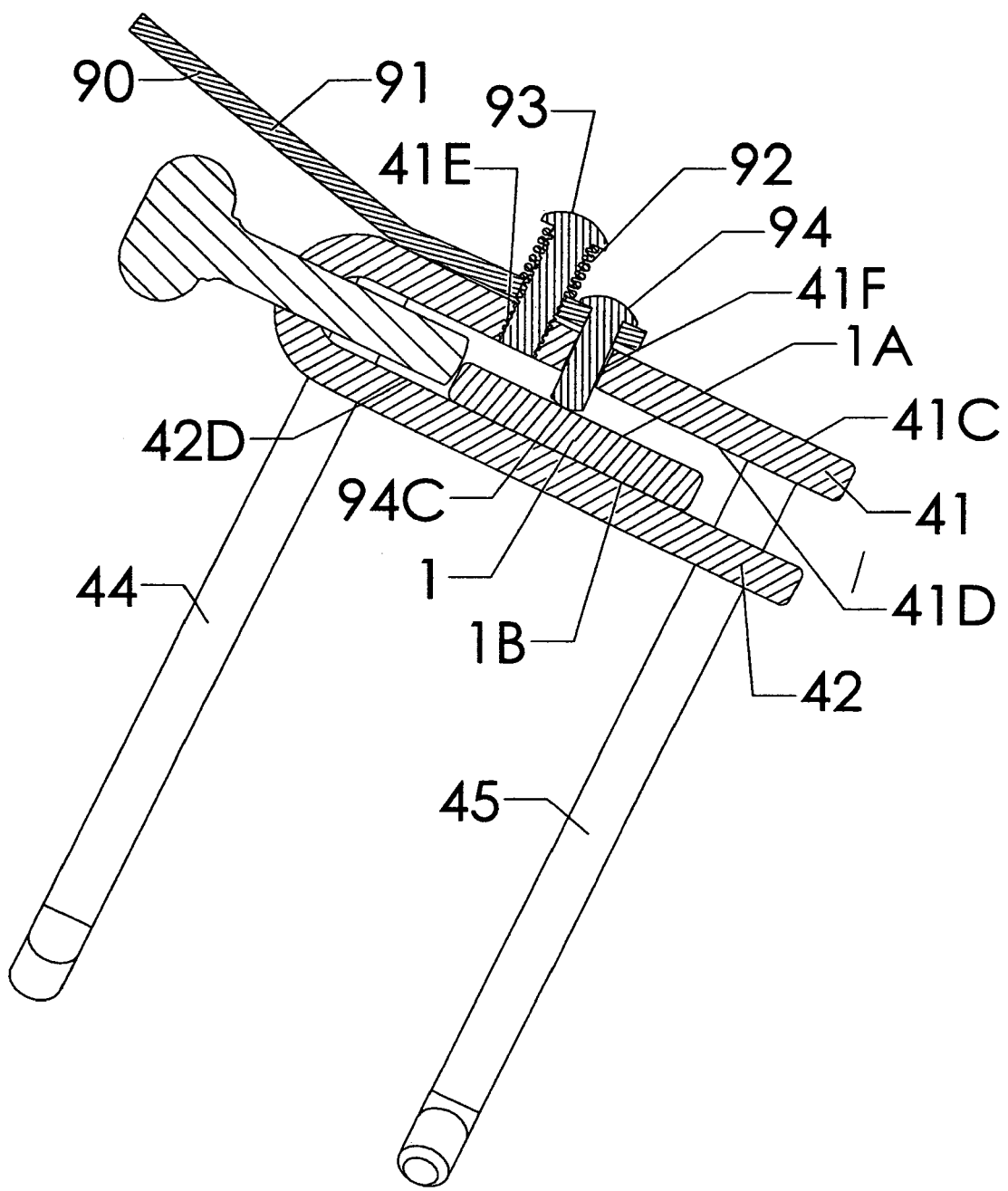
FIG. 11 illustrates a top plan view through the cross section A-A of FIG. 10 of the upright member and the cooking vessel handle support mechanism with its primary locking device being a spring-loaded lever mechanism.
Figure 12:
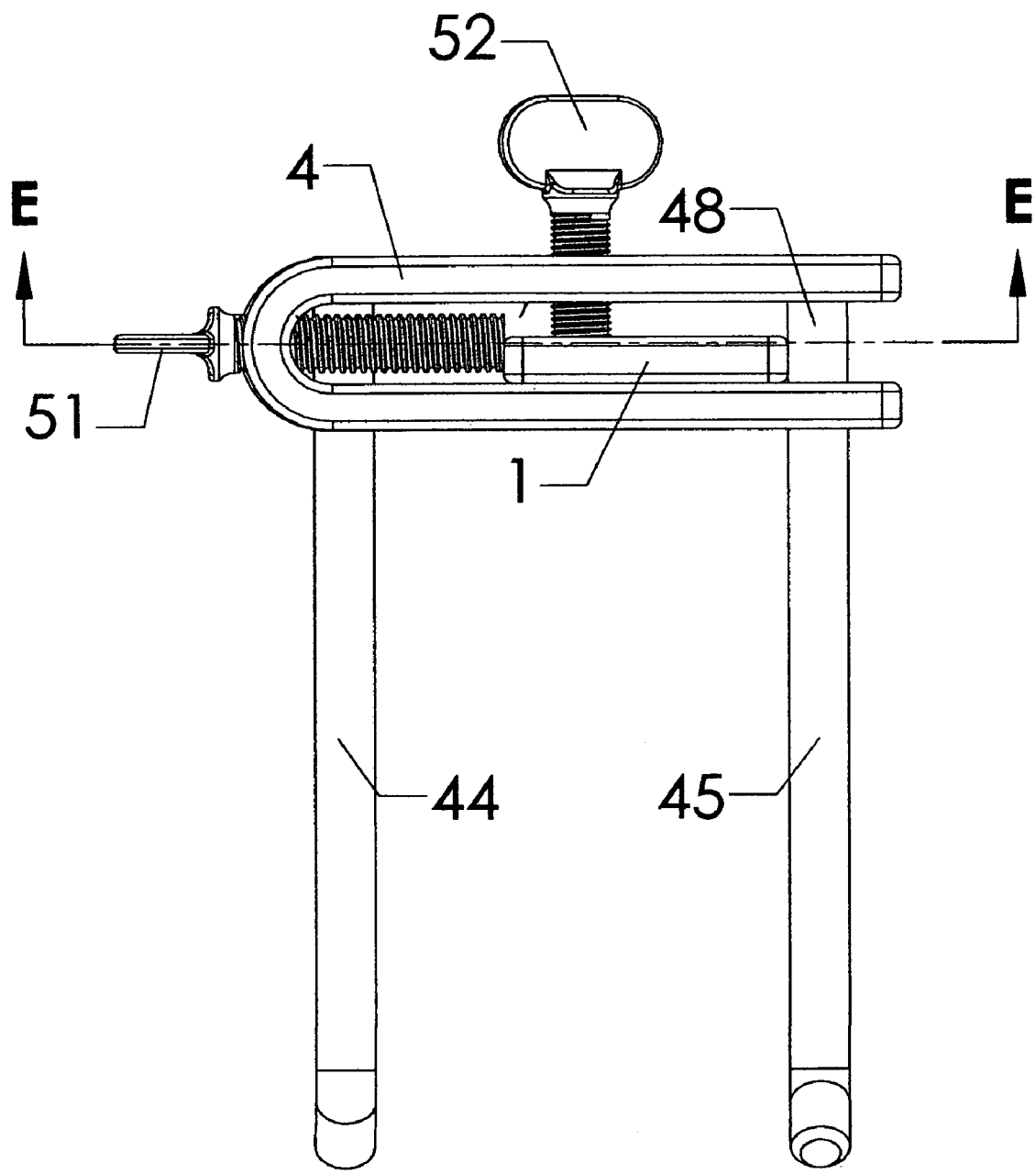
FIG. 12 illustrates a top plan view of the cooking vessel handle support mechanism with a top view of a portion of the vertical central post, the primary locking device utilizing a threaded thumb screw, two support pins, the pivotal adjustment screw device, and the line of cross-section E-E.
Figure 14:
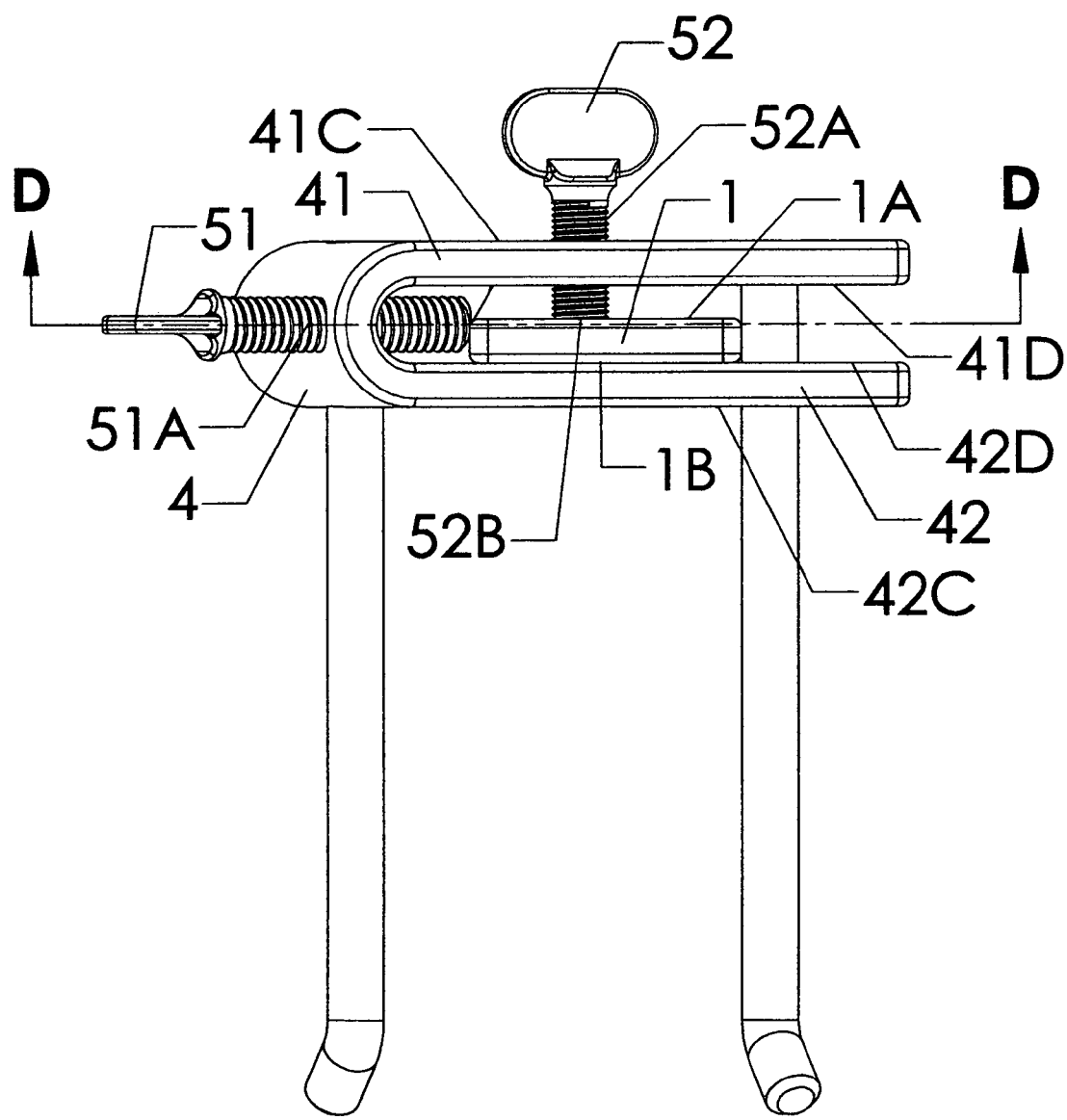
FIG. 14 illustrates a top view of the cooking vessel handle support mechanism and the vertical upright member as shown in FIG. 12 with a proposed cut line of cross-section D-D.

In the form of construction shown in FIG. 1, an adjustable cooking vessel holding device is composed of an upright member 1, a support foot 2, a second support foot 3 and a cooking vessel handle support mechanism 4. In this preferred embodiment, the upright member 1 is constructed from a flat-bar stock of approximately a one-to-six ratio in relation to its thickness and width and has at its lower extremity an approximately 45 degree twist 6, as shown in FIG. 2, and an approximately 90 degree bend 7 between the lowest extremity of the upright member 1 and the support foot 2. The approximately 90 degree bend 7 allows the upright member 1 and the support foot 2 to be constructed out of one piece of flat bar stock, making support foot 2 an extension of upright member 1. The bend 7 may be slightly more than 90 degrees, thus positioning the upright member 1 at a slight decline in relation to the vertical. This slight decline positions the center of gravity of a cooking vessel 5, as shown in dashed lines in FIG. 1 which cooking vessel is not part of this invention distally away from the vertical plane towards the center point of the triangle formed by the inner edges of the two spread support feet 2 and 3, forming angle "A" seen in FIG. 2, and the connecting line between the outer ends of the two support feet 2 and 3 for an optimum balance. The approximately 45 degree counterclockwise twist 6 at the lower end of the upright member 1, as shown in FIG. 2, aligns the plane of the two parallel wider sides 1A and 1B of the rectangular flat bar construction of the upright member 1, as shown in FIG. 11 and FIG. 14, parallel with the plane of the center axis, equally dividing angle "A" between spread support feet 2 and 3, as shown in FIG. 2. Angle "A" can be anywhere between zero degrees and 360 degrees, but preferably about 90 degrees. The ability to change angle "A" allows the cook to adjust the spread of the support feet 2 and 3 in order to be able to fit the support feet under or around obstructions within a hearth, a fire ring, under a woodstove or in or near any other fire retaining source. It also allows the cook to adjust angle "A" to zero degrees for storing, cooling or transporting the invention in a "folded flat" manner. FIG. 2 also shows an attachment option 8 for support foot 2 and support foot 3. Support foot 2 and support foot 3 are preferably constructed of the same shaped material as upright member 1, which is a flat-bar stock with an approximate one-to-six ratio in relation to its thickness and width. The attachment option 8 shows the employment of a screw device. While other attachment methods and material shapes can be employed, the use of a screw device as shown is preferred. In this preferred embodiment a threaded lag-style bolt is received by a bore drilled or punched through the thickness of support foot 2 at its end closest to bend 7; or by a washer, and by another bore, drilled or punched through the thickness on one end of support foot 3; or by a spring washer and finally secured by a threaded nut. While a plurality of support feet can be employed, two support feet are preferred, as shown.

Figure 3:
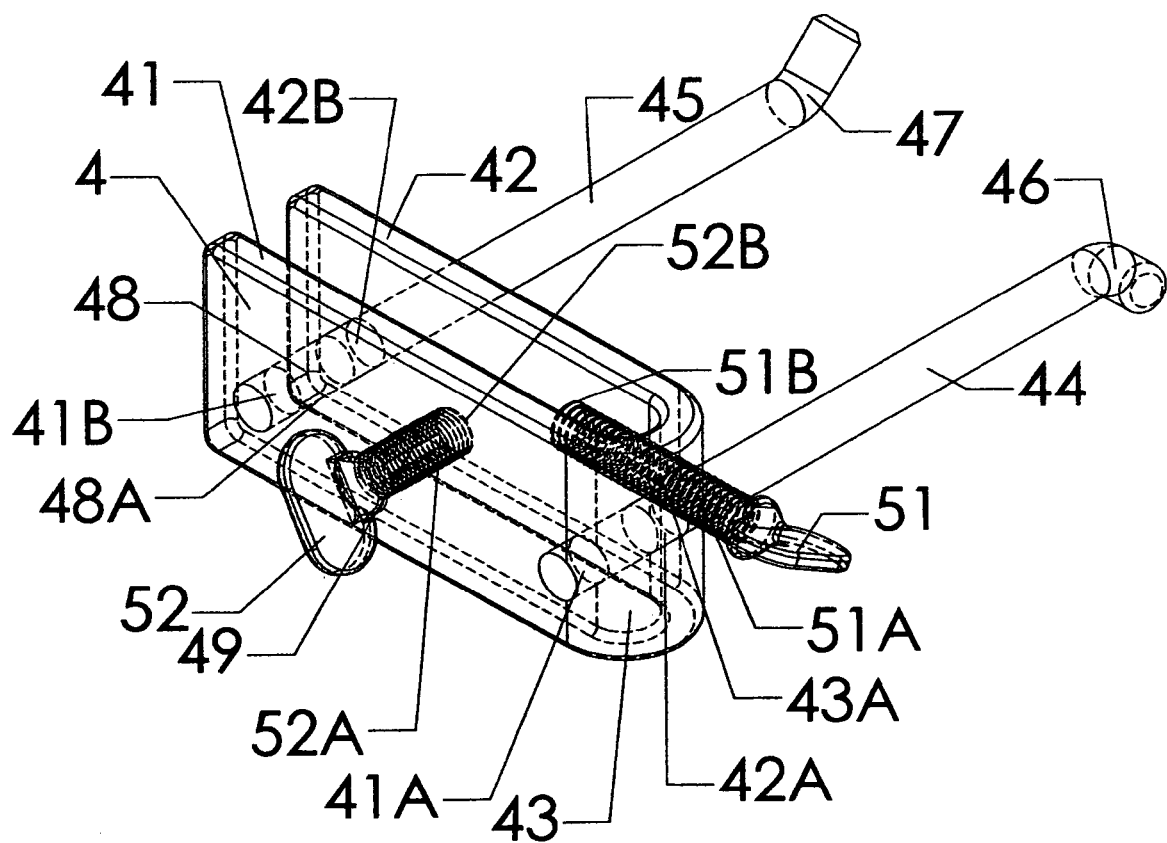
FIG. 3 illustrates a perspective view of the fully assembled cooking vessel handle support mechanism, including the main component, the primary locking device, the pivotal angle adjustment device, and the two cooking vessel handle support pins where the main component is shown being constructed out of one piece of flat stock bent 180° degrees at its midpoint and positioning the two flat end-pieces of approximately equal length, parallel to each other and rigidly spaced apart.

FIG. 3 shows the preferred embodiment where the cooking vessel handle support mechanism 4 is constructed out of two flat bars 41 and 42. Flat bars can be constructed of the same shaped material as upright member 1 and support feet 2 and 3, which material is a flat-bar stock with an approximate one-to-six ratio in relation to its thickness and width. Flat bars 41 and 42 are of equal length and are mounted symmetrically, parallel and opposite to each other, with their wider surfaces facing each other, and are spaced apart by a distance that is slightly greater than the thickness of the upright member 1, allowing upright member 1 to be received by cooking vessel handle support mechanism 4. In this preferred embodiment the cooking vessel handle support mechanism 4 and the two flat bars 41 and 42 are constructed out of one piece of said flat bar stock, bent at the midpoint of its length between the two ends by 180 degrees by bend 43, with the inner radius of the 180 degree bend being slightly greater than half the dimension of the thickness of the upright member 1.

Figure 5:
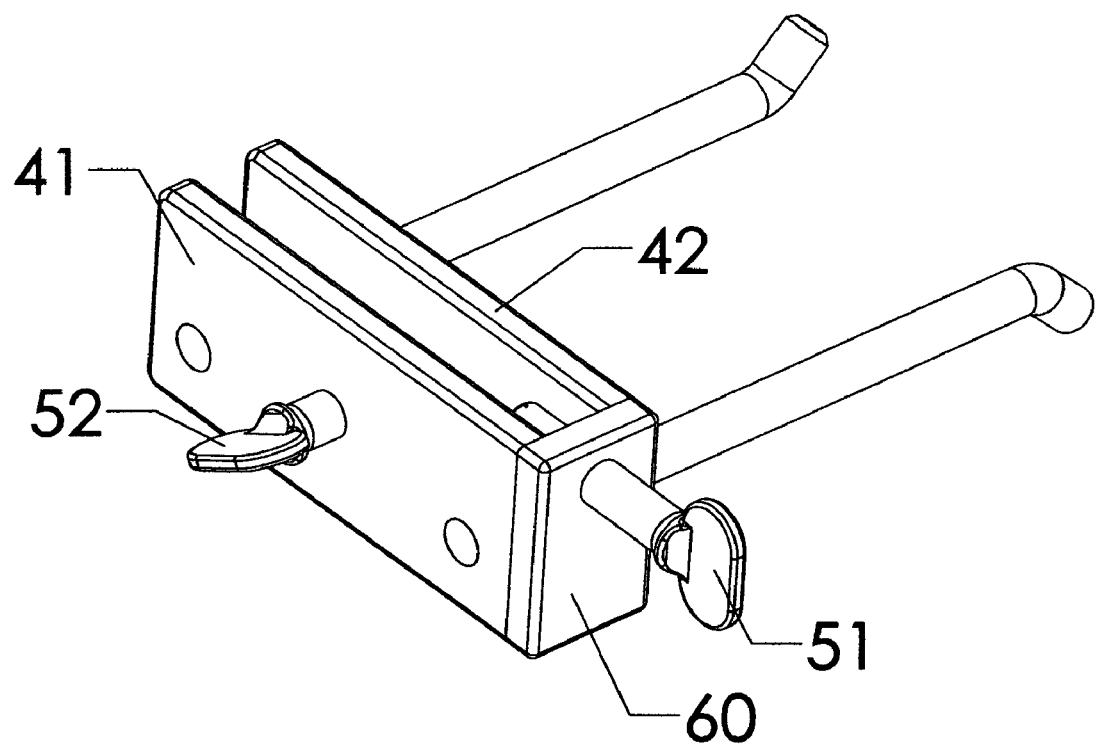
FIG. 5 illustrates a perspective view of a cooking vessel handle support in an alternative form of construction, where the main component is composed of two parallel flat bars of approximately equal length which are constructed from two pieces of flat bar and held in the desired spacing by an end cap that is bolted, riveted or welded to one end of each flat bar.

FIG. 5 shows an alternative embodiment utilizing another method of connecting bars 41 and 42 at the desired spacing, using an end cap 60 rigidly attached to the two ends of flat bars 41 and 42 by means of riveting, bolting, welding or any other suitable process.

Figure 6:
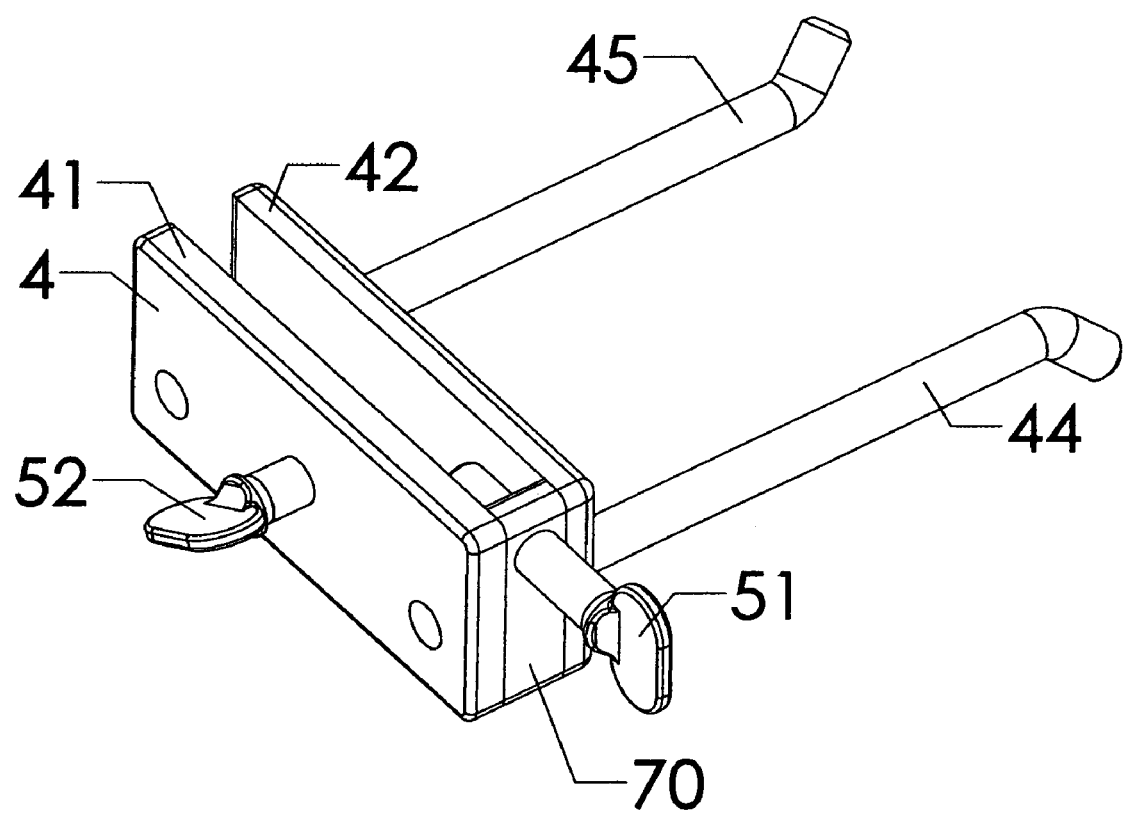
FIG. 6 illustrates a perspective view of a cooking vessel handle support in an alternative form of construction, where the main component of the cooking vessel handle support mechanism is comprised of two parallel flat bars constructed from two pieces of flat bar, spaced apart by a spacer block that is sandwiched between the two ends of the parallel flat bars and held in place by a riveting, bolting or welding process.

FIG. 6 illustrates an embodiment with yet another alternate method of connecting flat bars 41 and 42 by using a spacer block 70 sandwiched between the two flat bars 41 and 42 which are rigidly held in place by means of riveting, bolting, welding or any other suitable process.

Figure 4:
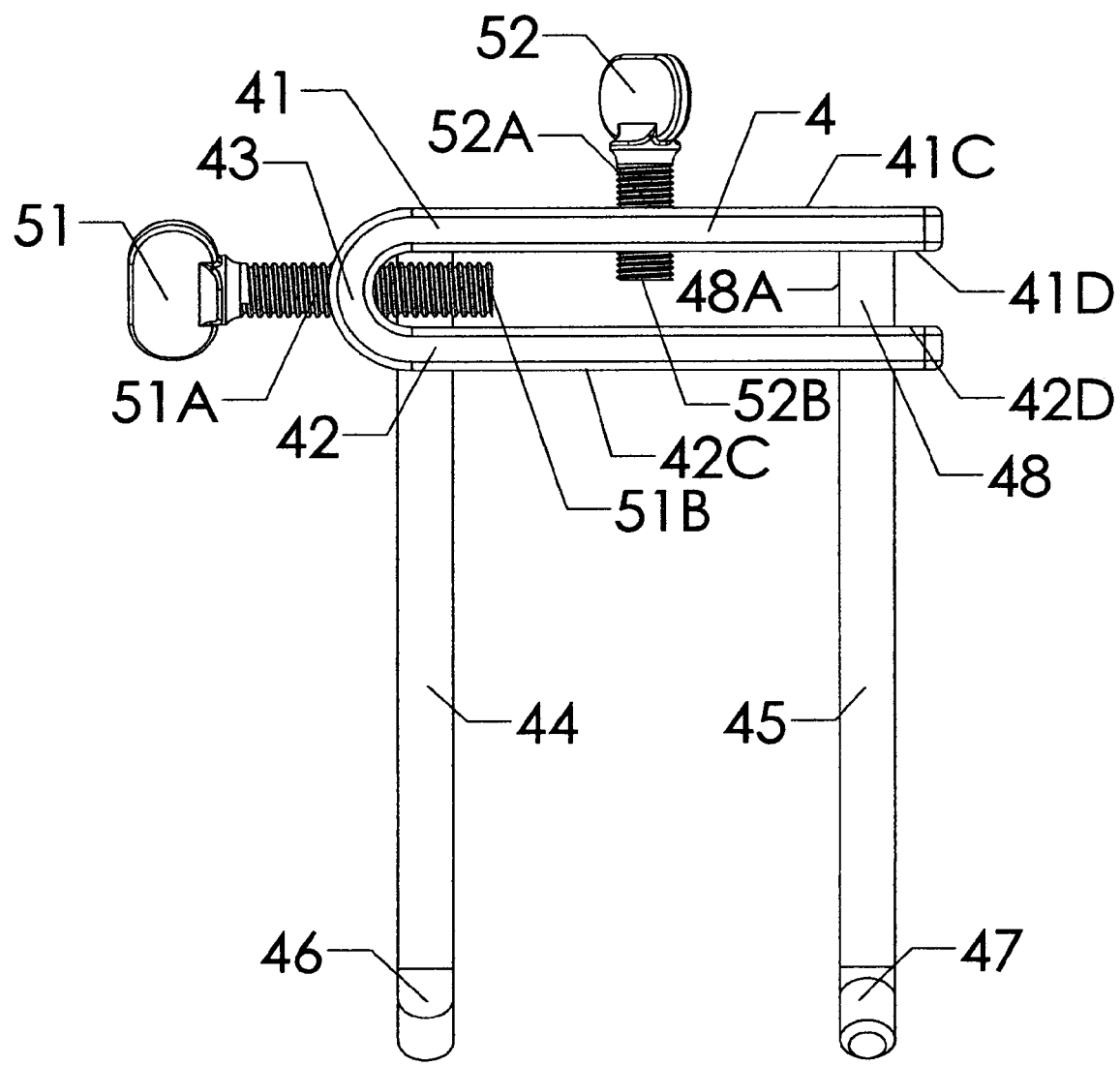
FIG. 4 illustrates a top plan view of the same fully assembled cooking vessel handle support mechanism, as shown in FIG. 3.

FIG. 3 and FIG. 4 show the cooking vessel handle support mechanism 4 with a primary locking device consisting of a manual screw mechanism. While many threaded screw mechanisms can be employed, a threaded thumb screw 52 is preferred, as shown. FIG. 3 and FIG. 4 show the threaded shaft 52A of threaded thumbscrew 52 being received by a threaded bore 49 drilled or punched through the thickness or narrower dimension of flat bar 41, perpendicular to the surfaces 41C and 41D, as shown in FIG. 14.

Figure 7:
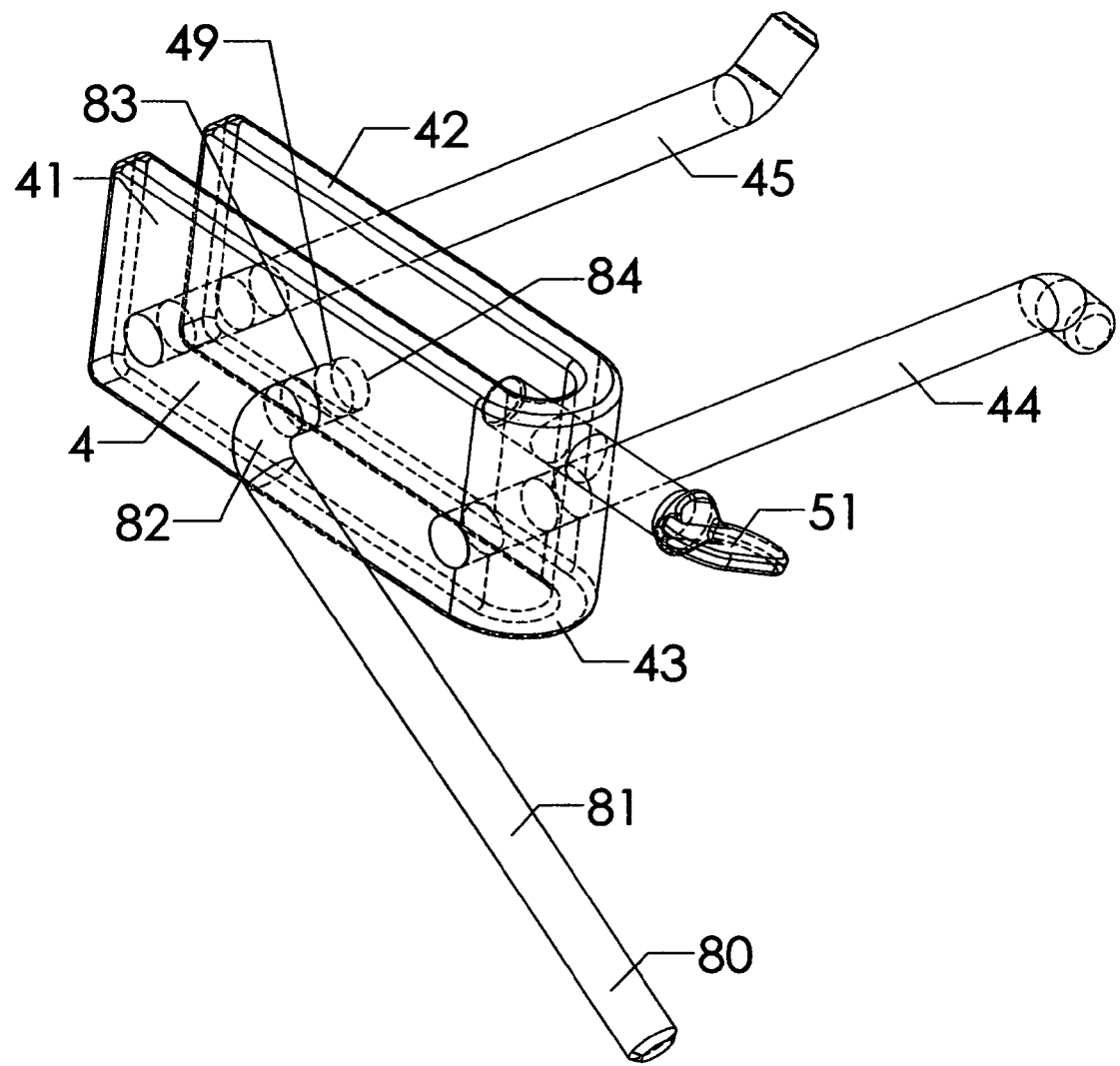
FIG. 7 illustrates a perspective view of a cooking vessel handle support in yet another alternative form of construction, where for its primary locking means a bent threaded locking arm is used, received by an internally threaded bore in the wall of one of the flat bars.

FIG. 7 shows an alternate embodiment of the cooking vessel handle support mechanism 4. This embodiment relates to a alternative construction of the primary locking device where the locking mechanism 80 consists of a handle bar 81, a threaded nipple 83 connected by an approximately 90 degree bend 82, where said threaded nipple is received by a threaded bore 49 which is drilled or punched through the thickness or narrower dimension of flat bar 41, perpendicular to the surfaces 41C and 41D, as shown in FIG. 14.

Figure 8:
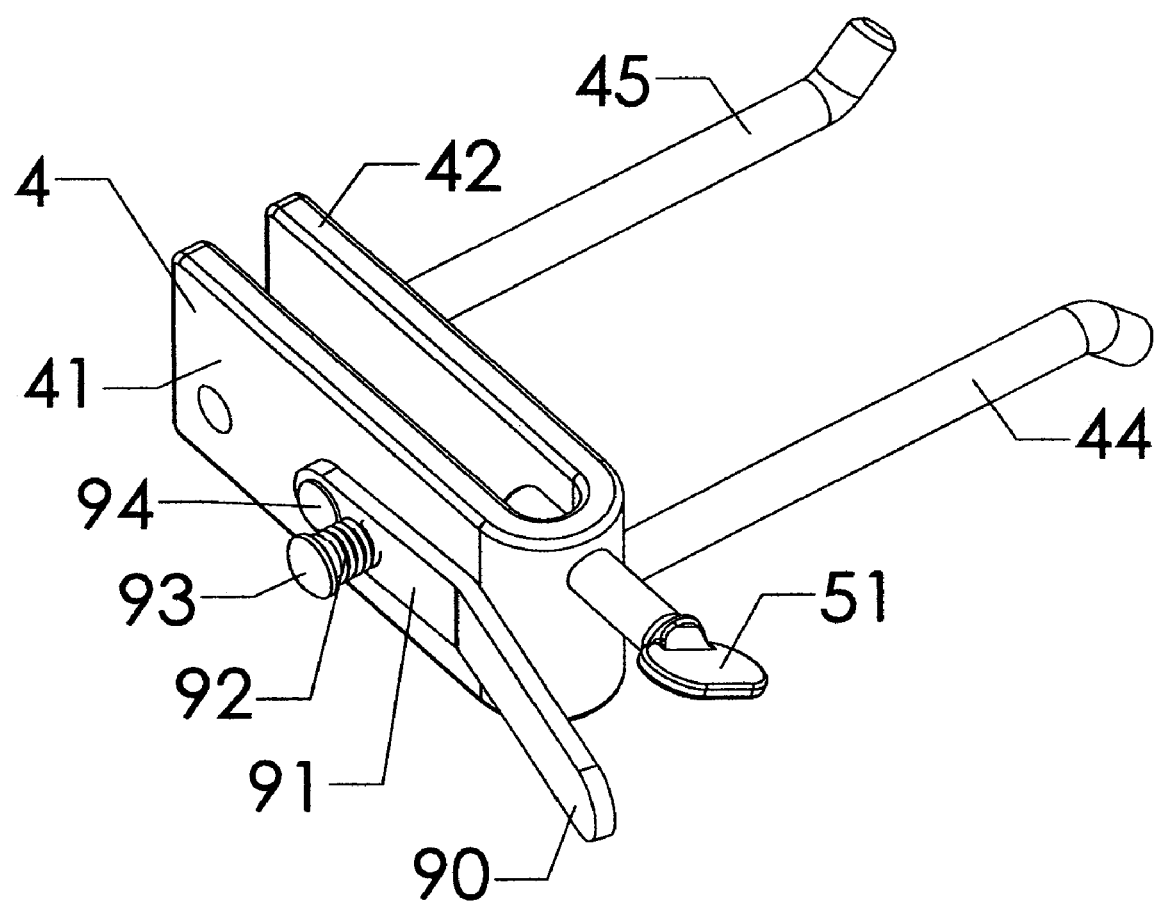
FIG. 8 illustrates a perspective view of another embodiment of a cooking vessel handle support, where the devices primary locking device, is a spring-loaded lever mechanism mounted to the side of the flat bar, with a friction pin extending through a bore in the flat bar.
Figure 9:
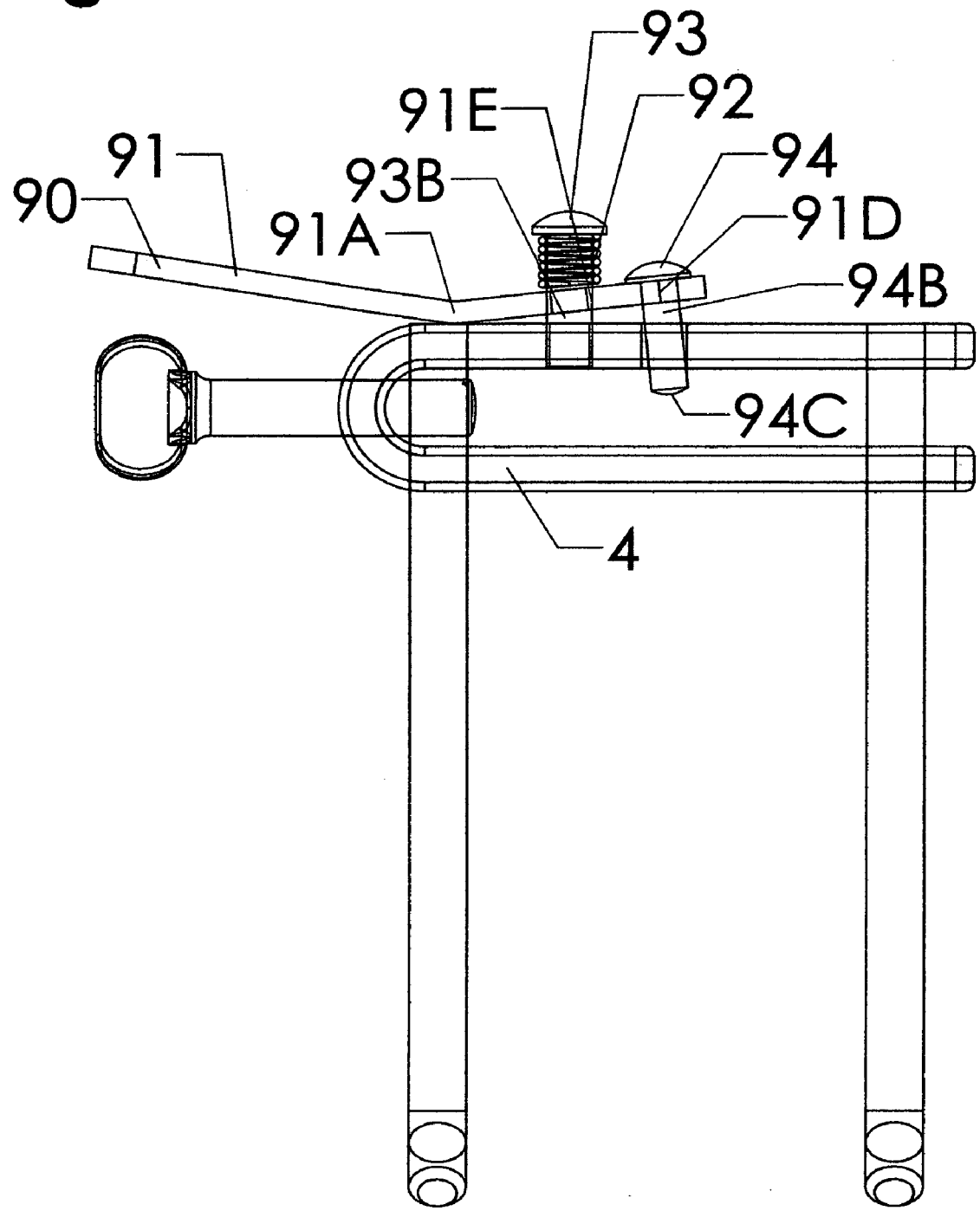
FIG. 9 illustrates a top plan view of the alternative form of construction shown in FIG. 8 of the device's primary locking device, showing the spring-loaded lever mechanism with all its components in a depressed position.

FIG. 8 illustrates a view similar to that of FIG. 3, but the embodiment of FIG. 8 relates to yet another construction of the primary locking device where a spring loaded locking mechanism is employed. FIG. 9 and FIG. 11 show this locking mechanism 90 comprising a bent lever bar 91, a compression spring 92, a compression spring support pin 93 which threaded shaft 93B is received trough aperture 91E in the bent lever bar 91, and rigidly mounted in threaded bore 41E in flat bar 41 where the center axis of threaded bore 41E is perpendicular to flat surface 41C. Locking mechanism 90 also comprises a friction pin 94 where the shaft 94B of the friction pin 94 is mounted rigid through aperture 91D on the end portion of the shorter end of bent lever bar 91. The free end of the friction pin 94, which is projecting in a perpendicular manner in relation to the wider flat surface of the bent rocking lever bar 91, is received by a bore 41F that is slightly larger than the diameter of friction pin 94 and said bore being drilled or punched through the thickness or narrower dimension of flat bar 41 between the surfaces 41C and 41D. With the expanding forces applied by the compression spring 92 onto the bent rocking lever arm 91A, the spring-loaded locking device frictionally engages the frictional engagement surface 94C of friction pin 94 with the wider surface 1A of the upright member 1, subsequently applying pressure onto the surface 1A of the upright member 1 and horizontally forcing the opposite surface 1B of the upright member 1 against the inner wider surface 42D of flat bar 42 of said cooking vessel handle support mechanism 4, thus frictionally locking the cooking vessel handle support mechanism 4 into place at any desired height along the vertical upright member 1. By manually applying pressure in a horizontal direction on the concave-shaped side of the free end of the bent rocking lever arm 91, the friction pin 94 is retracted within bore 41F, as shown in FIG. 9 and FIG. 11 section A-A, subsequently disengaging the frictional engagement surface 94C from the wider surface 1A of the upright member 1, eliminating the frictional contact between the surface 1B of the upright member 1 and the surface 42D of flat bar 42 of said cooking vessel handle support mechanism 4, and thus allowing the cook to vertically move said cooking vessel handle support mechanism 4 to any desired position along the upright member 1. By ceasing manually applied pressure to the free end of the bent lever bar 91, the expanding forces of the compression spring will again lock the cooking vessel handle support mechanism 4 into place at any desired height along the vertical upright member 1 with the means described above.

Figure 9A:
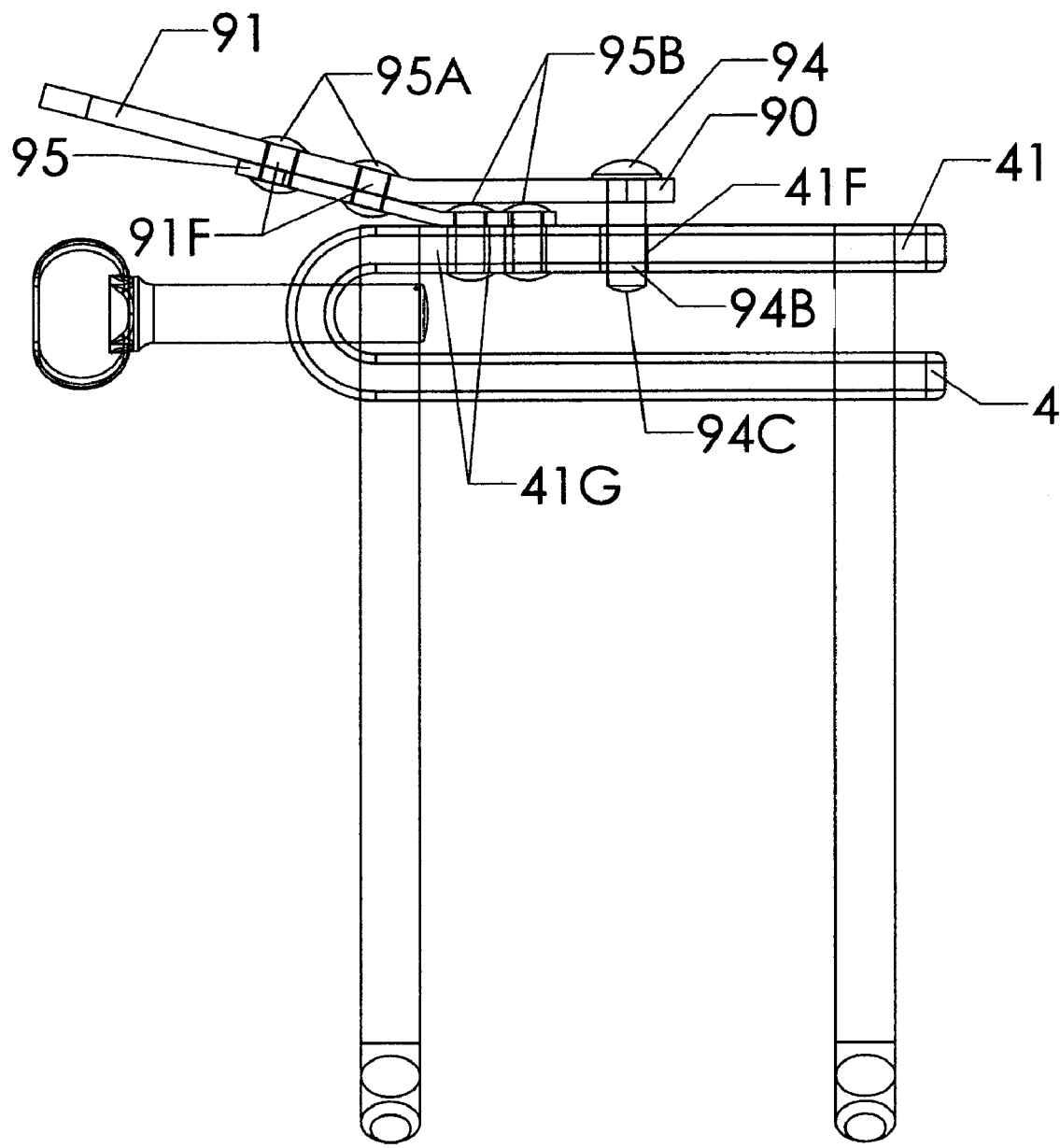
FIG. 9A illustrates a top plan view of the embodiment of FIG. 8 utilizing a flat spring-loaded lever bar.
Figure 10:
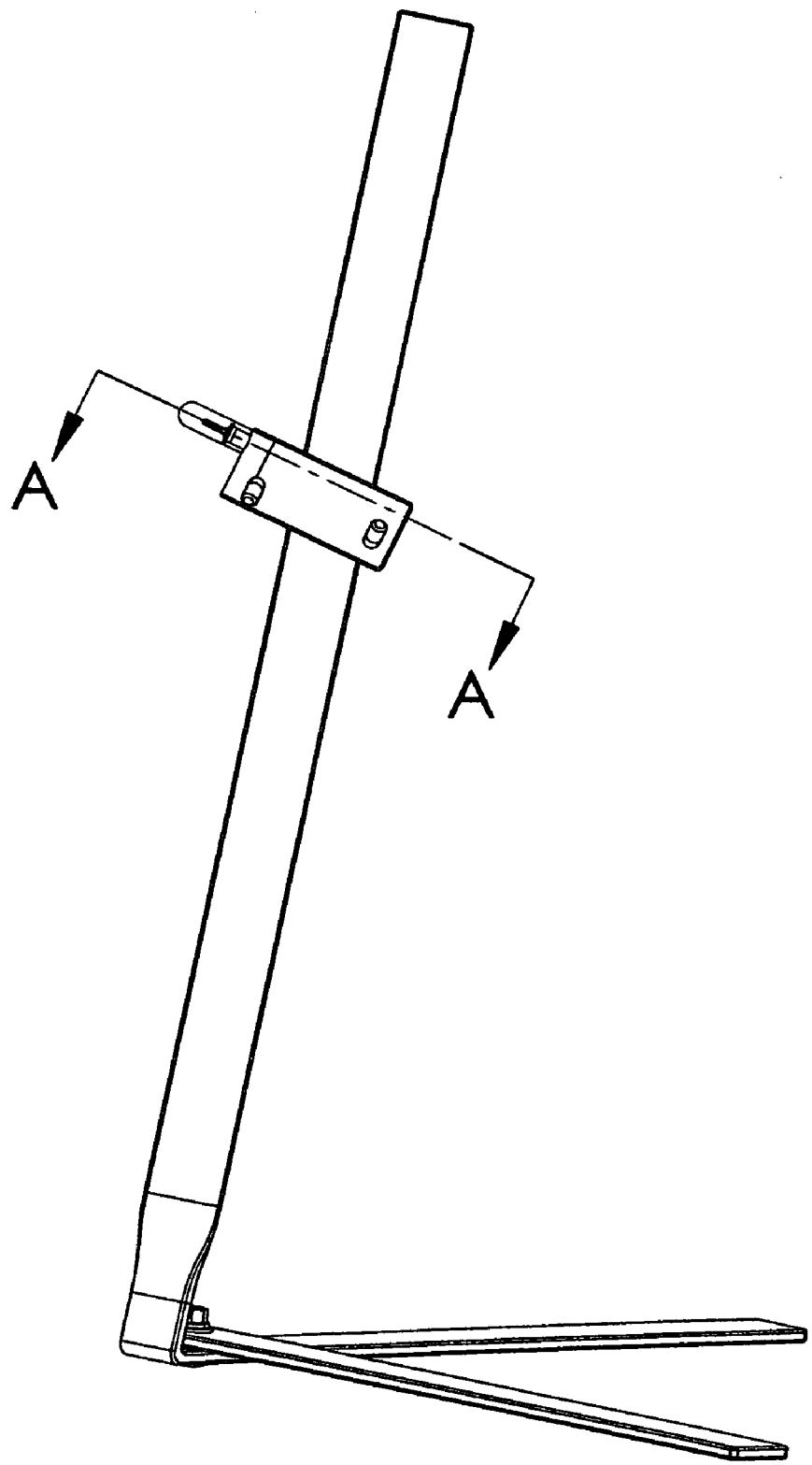
FIG. 10 illustrates a side view of the upright member and the cooking vessel handle support mechanism including a cross section through A-A.

FIG. 9A illustrates a top plan view of a different embodiment as shown in FIG. 8. FIG. 9A shows the compression spring loaded locking mechanisms being replaced by a bent flat-spring loaded locking mechanisms. The shorter end of flat spring 95 is rigidly attached to flat bar 41 which is part of the cooking vessel support mechanism 4. Said flat spring 95 can be attached with, but is not limited to, a welding, soldering, bolting or riveting process. A riveting process is shown in FIG. 9A where rivets 95B are received through apertures in flat spring 95 and rigidly fasted in apertures 41G in said flat bar 41. FIG. 9A also shows the longer end of flat spring 95 being rigidly attached to the longer end of bent lever bar 90. Said flat spring 95 can be attached with, but is not limited to, a welding, soldering, bolting or riveting process. A riveting process is shown in FIG. 9A where rivets 95A are received through apertures in flat spring 95 and rigidly fasted through apertures 91F in bent lever bar 90. Said flat-spring locking mechanism shown in FIG. 9A performs at the same principles as said compression-spring locking mechanism shown in FIG. 9 and FIG. 11.

FIG. 14 shows a top view of the cooking vessel handle support mechanism 4 including a top view of the upright member 1. FIG. 14 shows the employment of screw device 52 as its primary locking device, as shown in FIG. 3 and FIG. 4. This screw device 52 consists of a thumb screw with a threaded shaft 52A which is received by threaded bore 49, as shown in FIG. 3. Bore 49 can be being drilled or punched through the thickness or smallest dimension of flat bar 41, between the surfaces 41C and 41D as shown in FIG. 14. With a clockwise or counterclockwise rotation of said thumb screw 52 within the confinements of the threaded bore 49, the tip end or friction engagement surface 52B can be advanced or retracted along the center axis of threaded shaft 52A from its current position. By advancing said friction engagement surface 52B, contact will be made between the friction engagement surface 52B and the flat surface 1A of the upright member 1, subsequently applying pressure onto the surface 1A of the upright member 1 and horizontally forcing the opposite surface 1B of the upright member 1 against the inner wider surface 42D of flat bar 42 of said cooking vessel handle support mechanism 4, thus frictionally locking the cooking vessel handle support mechanism 4 into place at any desired height along the vertical upright member 1. By rotating the thumbscrew 52 in the opposite direction, the tip end or the friction engagement surface 52B of said thumbscrew 52 will subsequently disengage from the wider surface 1A of the upright member 1, eliminating the frictional contact between the surface 1B of the upright member 1 and the surface 42D of flat bar 42 of said cooking vessel handle support mechanism 4, and thus allowing the cook to vertically move said cooking vessel handle support mechanism 4 to any desired position along the upright member 1.

An alternate version of the primary locking device 80, as shown in FIG. 7, uses bent handlebar with its threaded nipple 83 and its frictional engagement surface 84 received by the threaded bore 49 in flat bar 41 of the cooking vessel handle support mechanism 4. This version will perform on the same mechanical principles as the primary locking device 52, utilizing a threaded thumbscrew device, as described above.

FIG. 4, FIG. 7, FIG. 12, FIG. 13, FIG. 14, FIG. 15 and FIG. 17 show the cooking vessel surface angle adjustment device 51 which is shown as a threaded thumb screw received by a threaded bore drilled through the curved area of the 180 degree bend 43 that is rigidly connecting the two flat bars 41 and 42. Cooking vessel surface angle adjustment device 51 can also be received by a threaded bore drilled through end cap 60, as shown in FIG. 5, and spacer block 70, as shown in FIG. 6. The center axis of the threaded shaft 51A of the threaded thumb screw is aligned in a parallel manner in relation to the longer planes of the facing inner surfaces 41D and 42D of the two flat bars 41 and 42, as shown in FIG. 14.

FIG. 5 shows the cooking vessel surface angle adjustment device 51, where said device is shown as a thumb screw received by a bore drilled perpendicular through the wider surface of the end cap 60 of this alternate embodiment. The center axis of said bore is in the same plane as the center axis of bore 43A drilled through the 180 degree bend 43, as shown in FIG. 3, in relation to the two parallel flat bars 41 and 42 of the cooking vessel support bracket 4.

FIG. 6 shows the cooking vessel surface angle adjustment device 51, where the device is shown as a thumb screw received by a bore drilled perpendicular through the wider surface of the spacer block 70 of this alternate embodiment. The center axis of said bore is in the same plane as the center axis of bore 43A drilled through the 180 degree bend 43, as shown in FIG. 3, in relation to the two parallel flat bars 41 and 42 of the cooking vessel support bracket 4.

FIG. 3 and FIG. 4 show the cooking vessel handle support mechanism 4 from different angles. These different viewpoints show the positions and attachment method of the two cooking vessel handle support pins 44 and 45. The straight end of the support pin 44 is inserted through bore 42A in flat bar 42 and then into bore 41A in flat bar 41, with the end surface of the support pin 44 being flush with the surface 41C of flat bar 41. Respectively, support pin 45 is inserted through bore 42B in flat bar 42 and then into bore 41B in flat bar 41, with the end surface of support pin 45 being flush with surface 41C of flat bar 41. Bore 41A and 42A are aligned along and share the same center axis. Respectively, bore 41B and 42B are aligned along and share their own center axis. The center axes of holes 41A and 42A and holes 41B and 42B are positioned perpendicular to the wider surfaces 42D and 42C of flat bar 42 and the wider surfaces 41D and 41C of flat bar 41. The support pins 44 and 45 are mounted rigidly in their respective bores 41A and 42A and 41B and 42B. This rigid mounting process can be, but is not limited to, a press fit, threading, screwing or bolting process, or a fusing process such as welding or soldering. Both support pins 44 and 45 are mounted symmetrically and parallel to each other to one side of the cooking vessel handle support mechanism 4, and they project laterally away from flat bar 42 with their center axis perpendicular to the wider flat bar surface 42C.

Figure 13:
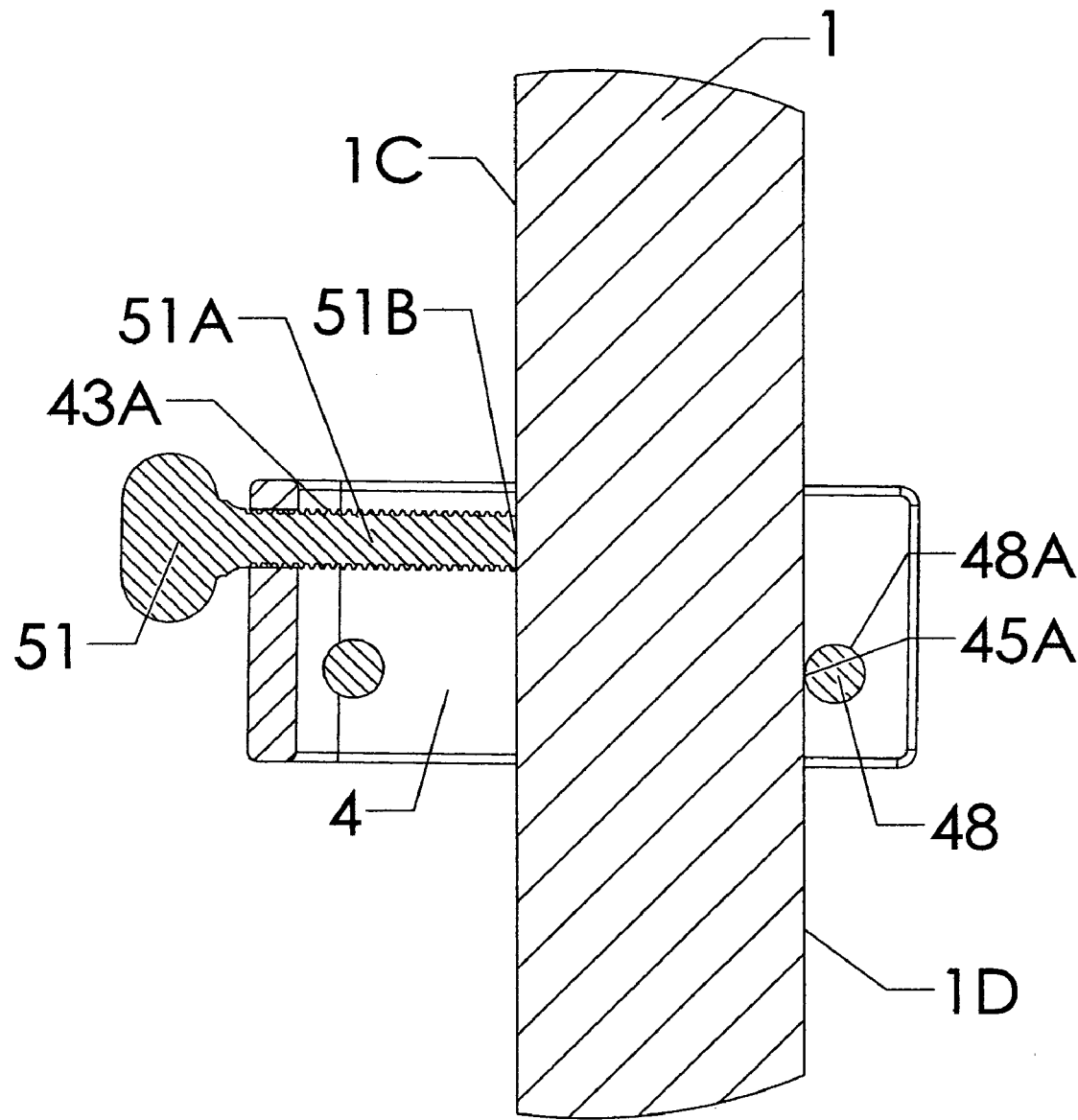
FIG. 13 illustrates a side elevational view through cross section E-E of the vertical central post and the cooking vessel handle support mechanism with the pivotal adjustment screw device, and with the two contact points frictionally engaging the two narrower dimensions of the vertical central post. One such contact point is the outside surface of the extension of one of the support pins and the other is the tip end of the threaded adjustment screw of the pivotal adjustment screw device. Also seen in this FIG is the threaded adjustment screw of the pivotal adjustment screw device being rotationally advanced within the internally threaded bore in the closed end of the cooking vessel handle support mechanism to its most extreme forward position, creating the shortest distance between the two contact points on the two narrower dimensions of the upright member.
Figure 15:
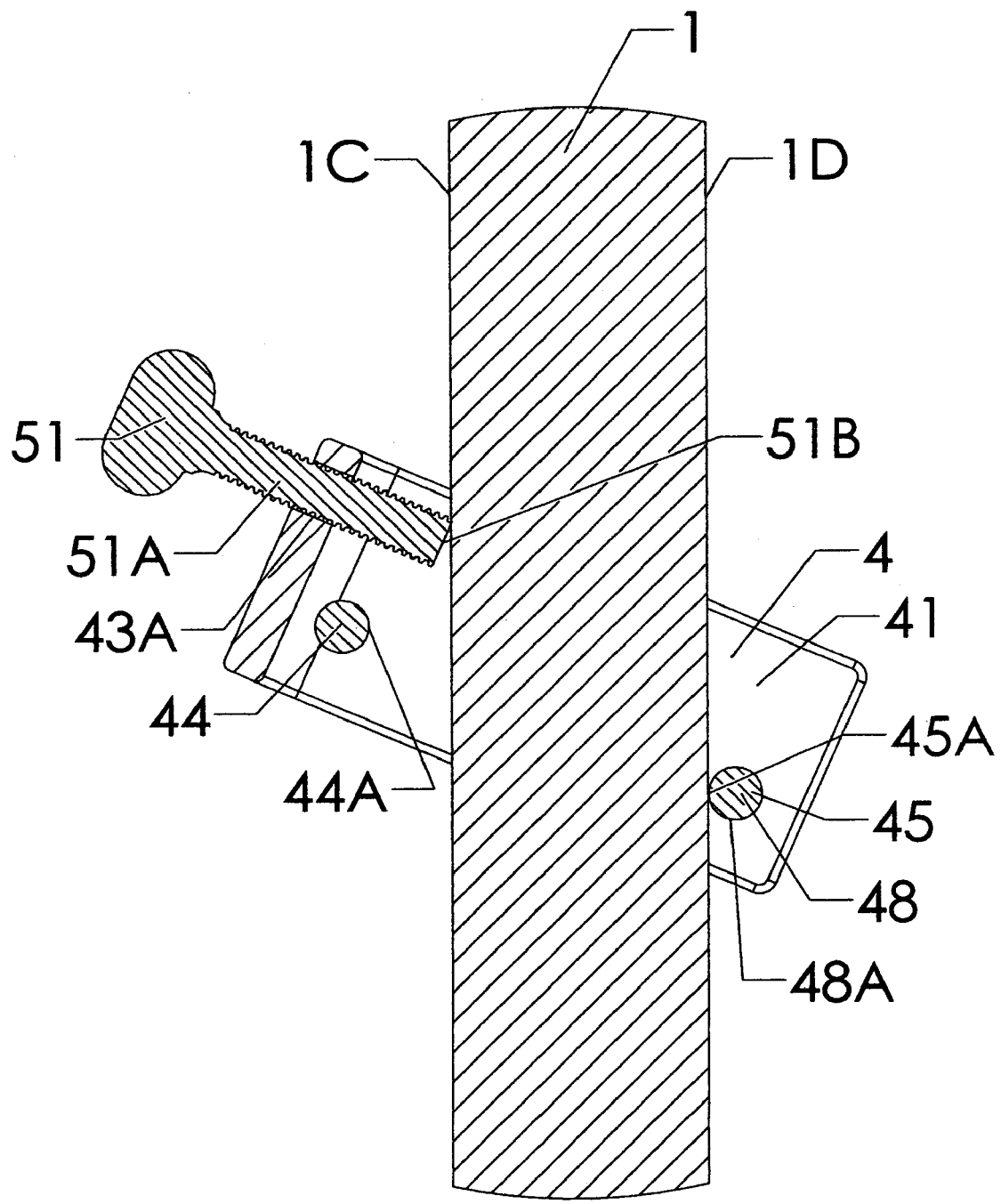
FIG. 15 illustrates a side elevational view through cross section D-D of FIG. 14 with the same components mentioned in FIG. 13, except for the threaded adjustment screw of the pivotal adjustment screw device being in a lesser advanced position within the internally threaded bore in the closed end of the cooking vessel handle support mechanism, shown in FIG. 13, thus lengthening the distance between the two frictional contact points on the two narrower dimensions of the vertical upright member which changing of the distance between the two frictional contact points creates a different angle between the horizontal plane of the cooking vessel handle support mechanism and the vertical plane of the upright member.
Figure 16:
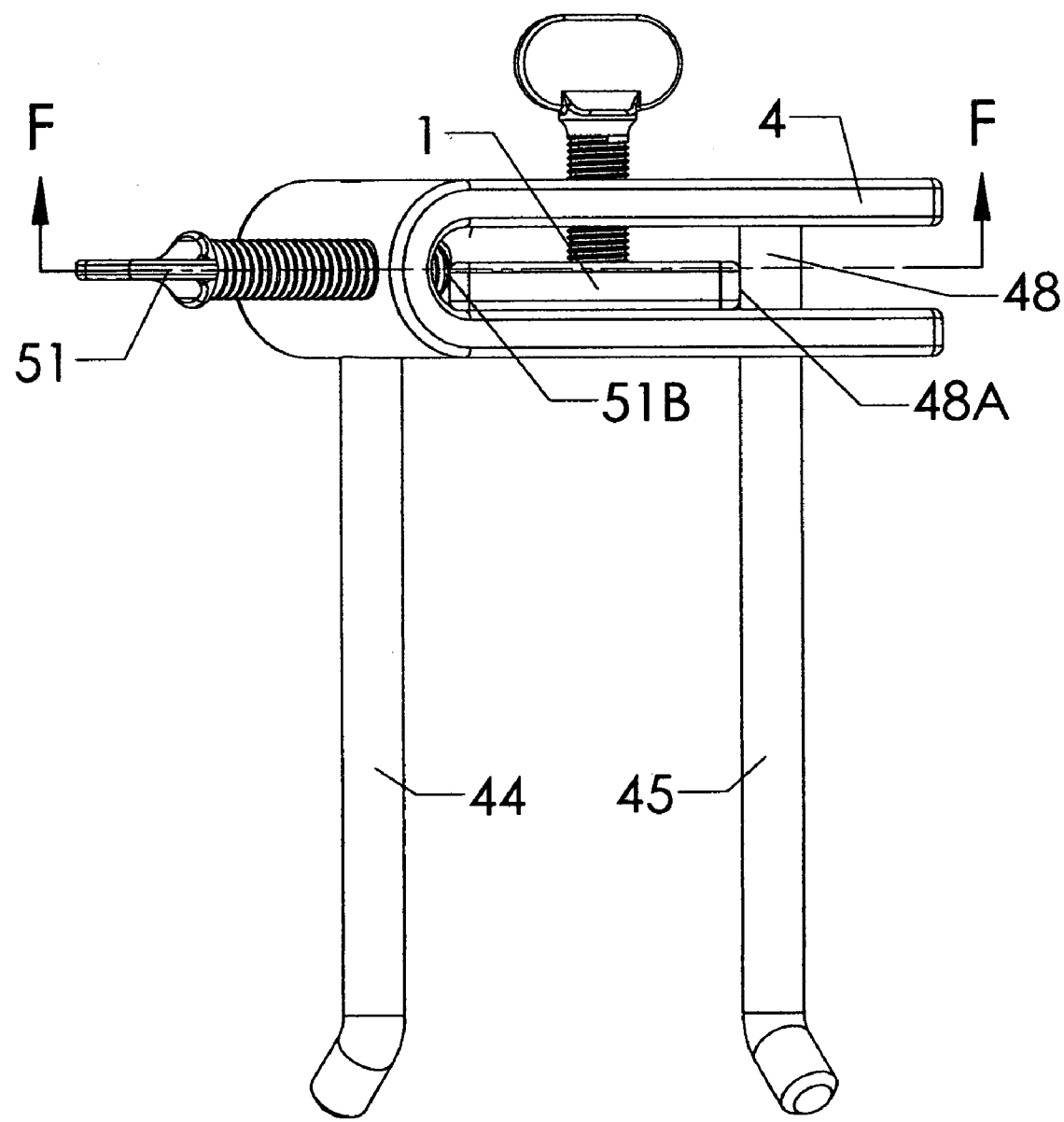
FIG. 16 illustrates a top plan view of the cooking vessel handle support mechanism and the vertical upright member as shown in FIG. 12 and FIG. 14 with a proposed cut line of cross-section F-F.
Figure 17:
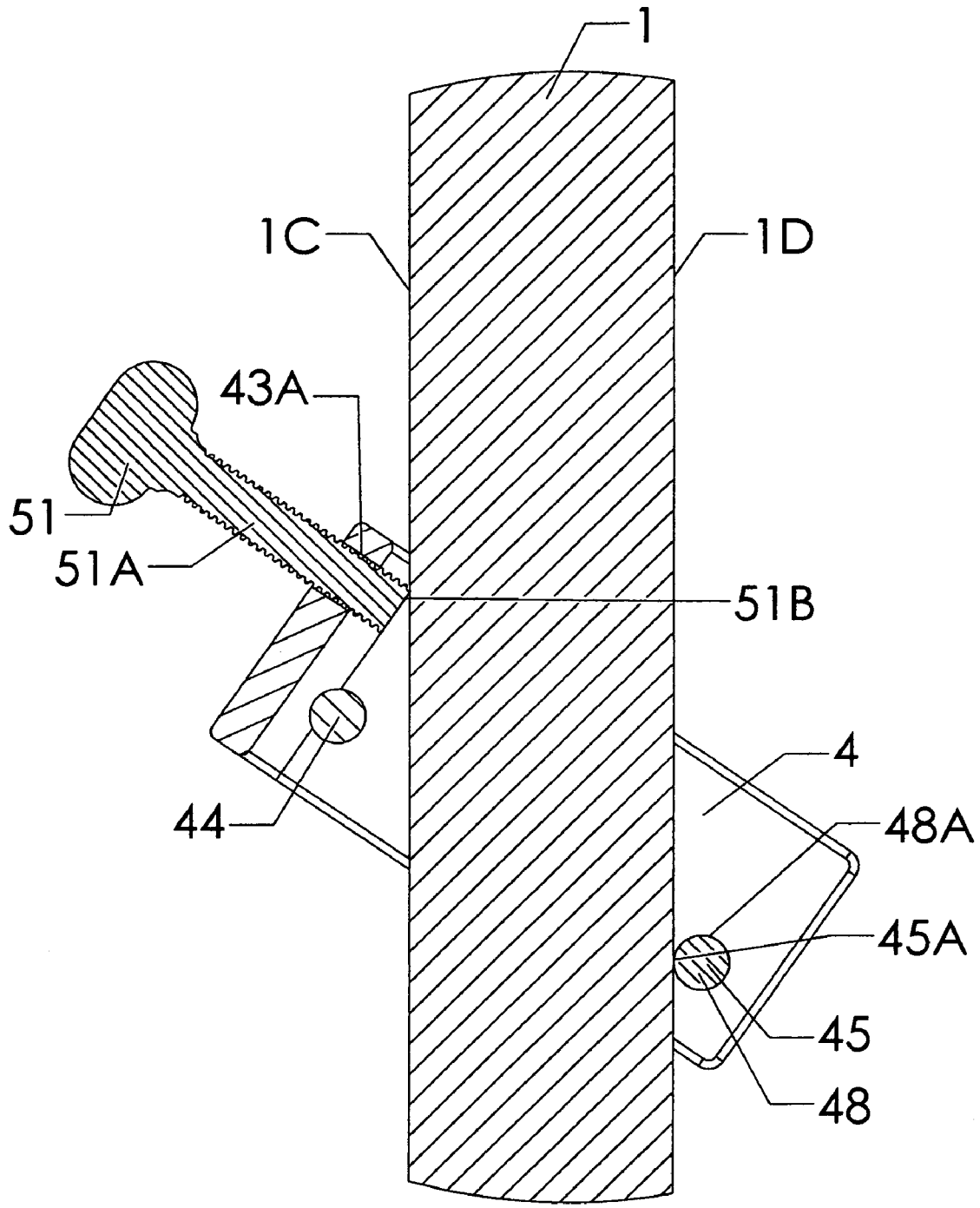
FIG. 17 illustrates a side elevational view through cross section F-F of FIG. 16 with the same components mentioned in FIG. 13 showing the threaded adjustment screw of the pivotal adjustment screw device being in its fully retracted position within the internally threaded bore in the closed end of the cooking vessel handle support mechanism which positioning changes the distance between the two frictional contact points along the two narrower dimensions of the vertical upright member, thus creating a different angle between the horizontal plane of the cooking vessel handle support mechanism and the vertical plane of the upright member.
Figure 18:
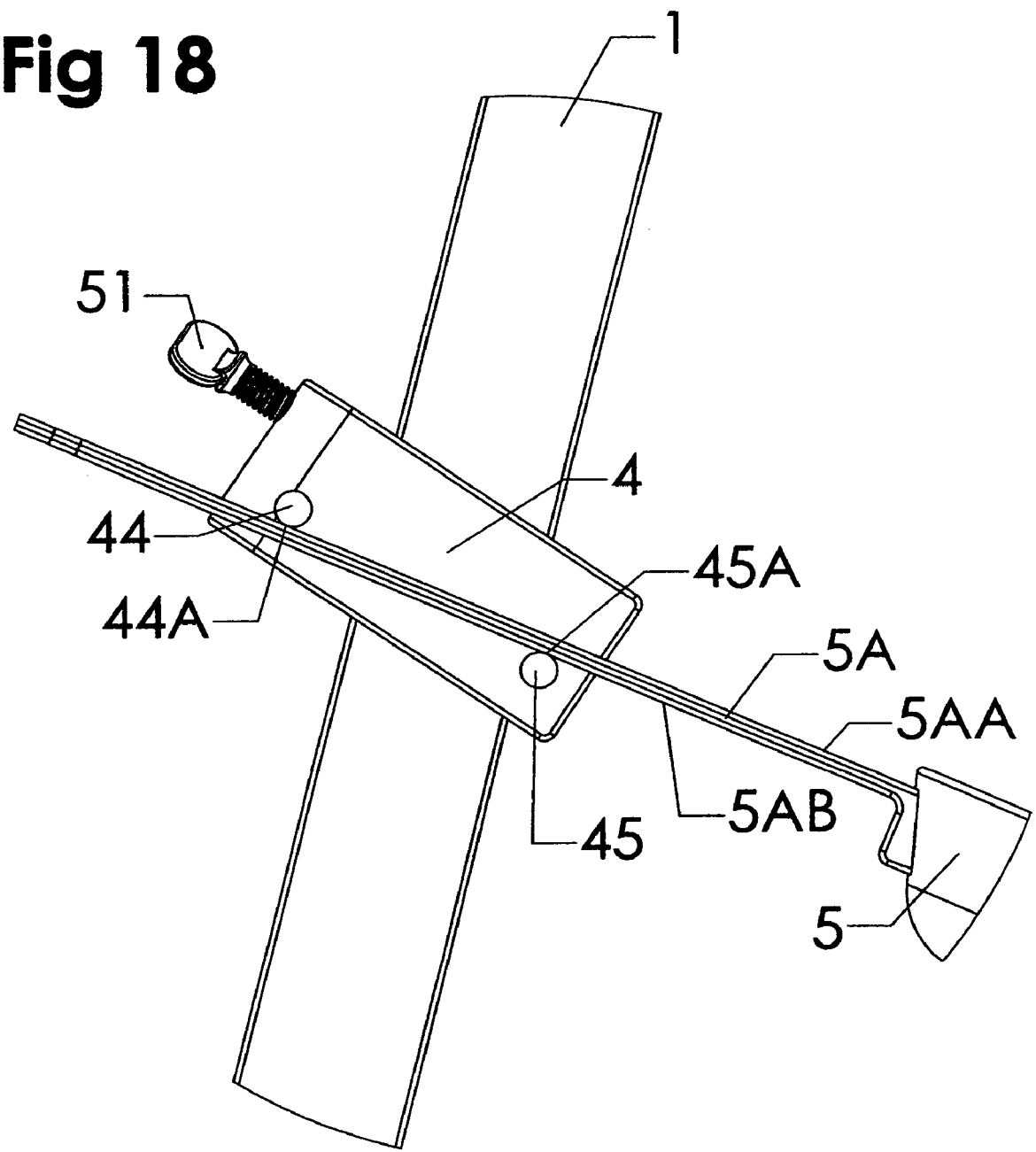
FIG. 18 illustrates a side elevational view of the upright member, the cooking vessel handle support mechanism including its cooking vessel handle support pins and a cooking vessel handle along with the frictional contact points between the cooking vessel handle support pins and the cooking vessel handle.
Figure 19:
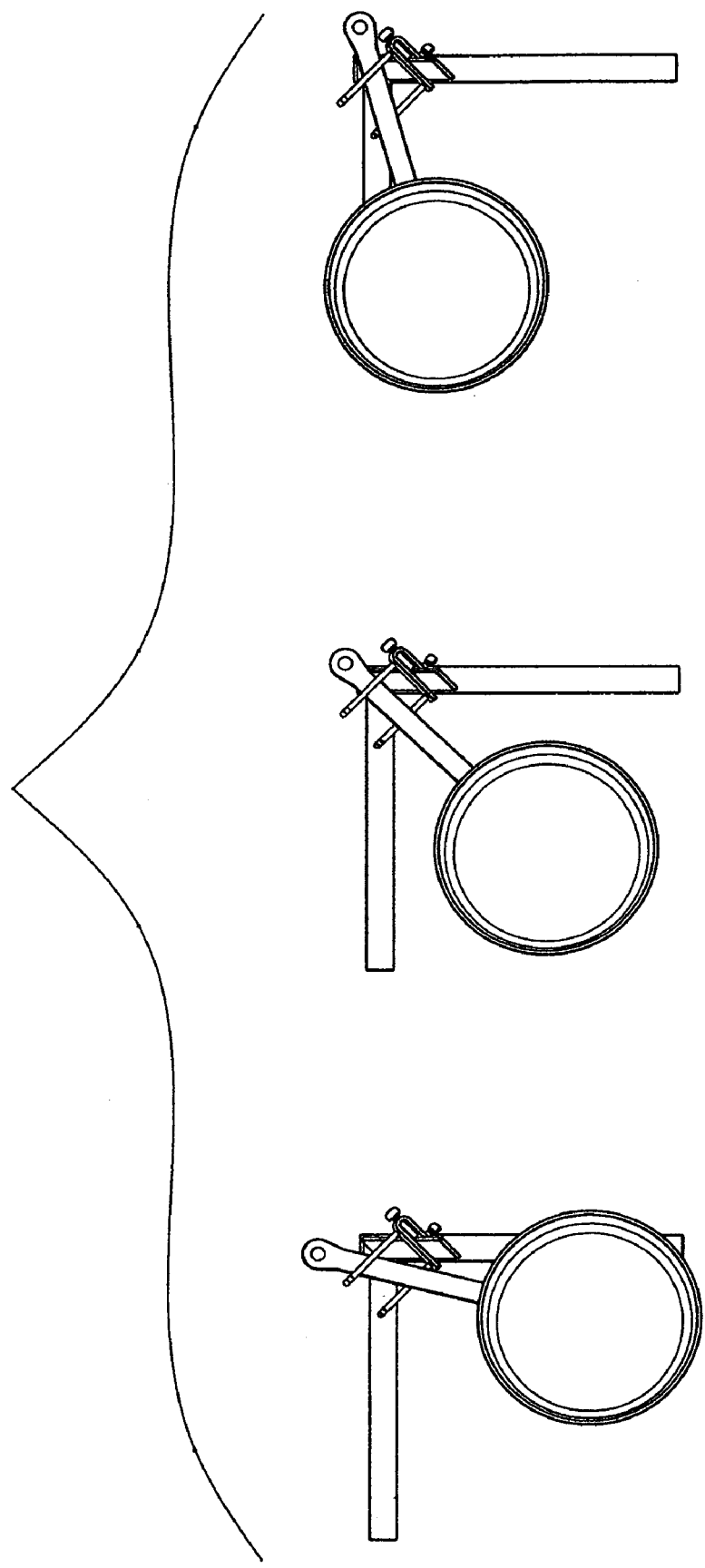
FIG. 19 illustrates a top plan view of this invention, showing a cooking vessel handle supported by the support pins in three of its possible different transverse lateral positions.
Figure 20:
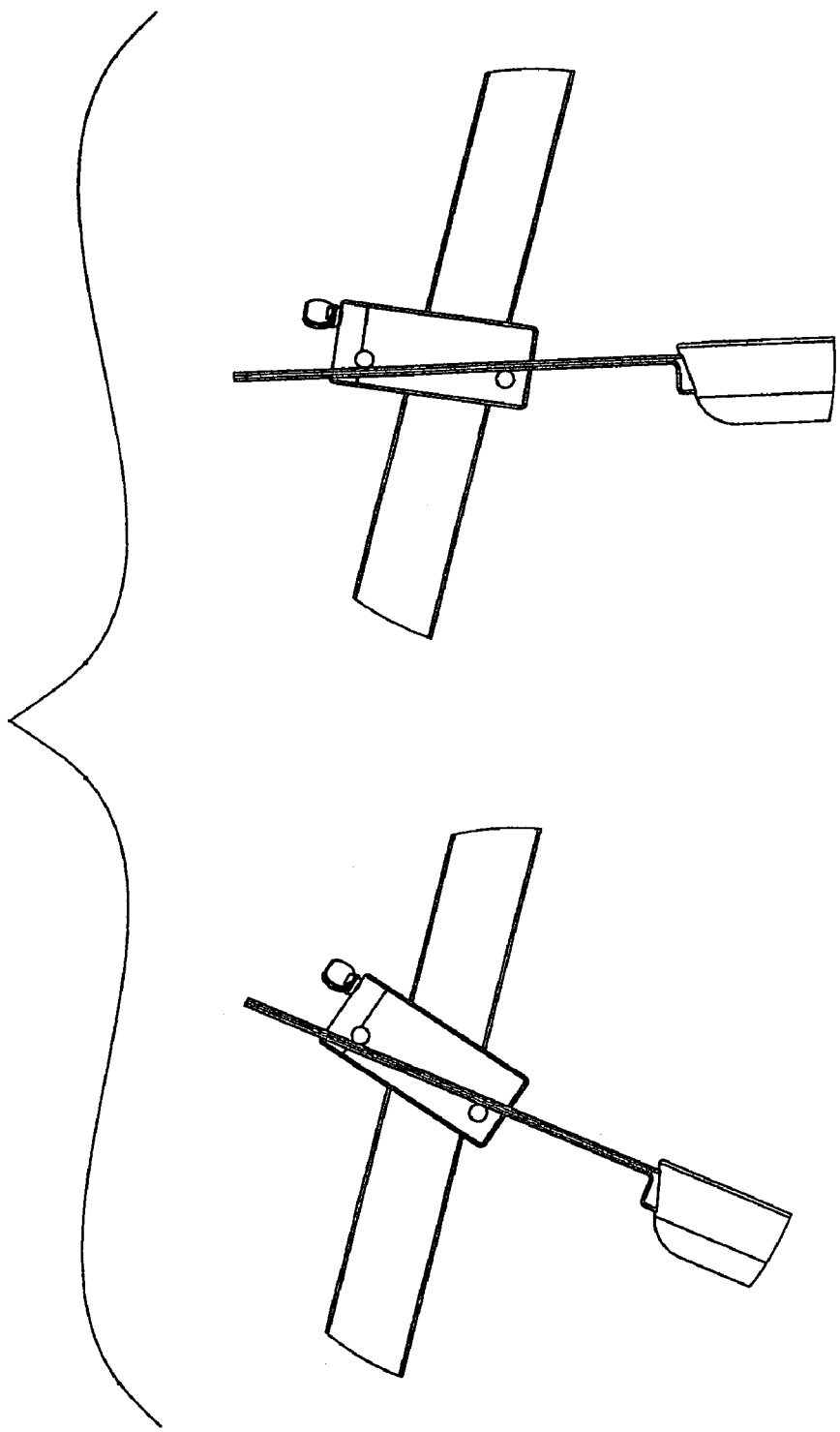
FIG. 20 illustrates a side elevational view of the cooking vessel support bracket with cooking vessel handle in two different horizontal positions.

In FIG. 3 and FIG. 4 the invention shows the support pins 44 and 45, where the end portion or the end facing away from flat bar surface 42C of support pin 44 shows a slight downward bend 46, and where the end portion or the end facing away from flat bar surface 42C of support pin 45 shows a slight upward bend 47. These two bends 46 and 47 create an obstruction, to prevent the various cooking vessel support handles and support bars from inadvertently sliding off the support pins 44 and 45. While other ways to create said obstructions are possible, the slight upward and downward bends of support pins 44 and 45 is preferred. The primary locking device allows the cook to position and lock in place the cooking vessel handle support mechanism 4 at any desired height along the upright member 1. With the cooking vessel handle support mechanism 4 locked in place along the vertical upright member 1, the cook is able to mount, engage and support cooking vessels by their handles and support bars 5A to the cooking vessel handle support mechanism 4 by means of engaging support pins 44 and 45, as shown in FIG. 1 and FIG. 18. These actions can be achieved by placing the part of the handle closer to the grip or closer to the end of the handle against the underside of the support pin 44 and by placing the part of the handle closer to the cooking surface over the support pin 45, thus freely suspending the cooking vessels in a cantilever manner over a fire or heat source. As shown in FIG. 18, the cooking vessel handle's upper surface 5AA, facing away from the horizontal plane of the hearth, is frictionally engaging the contact point 44A along the underside of support pin 44, such that the cooking vessel handle's lower surface 5AB facing down ward towards the horizontal plane of the hearth is frictionally engaging the contact point 45A along the upper surface of support pin 45. The forces of tension and compression applied to the rigidly mounted support pins 44 and 45 by the cooking vessel handle and the weight of the cooking vessel's main body torques the cooking vessel handle support mechanism 4 into a rotational forward and downward motion. As shown in FIG. 13, FIG. 15 and FIG. 17, these rotational forces frictionally engage (1) the surface 48A of the rigidly mounted friction pin 48, which is an extension of the support pin 45 connecting flat bar 41 and flat bar 42, with the narrower surface 1D of upright member 1 and (2) the end surface 51B of the cooking vessel surface angle adjustment device 51 with the opposing narrower surface 1C of the upright member 1. The distance between friction pin 48 and the friction surface 51B of the pivot adjustment device 51 determines the angle of the cooking vessel support mechanism 4. The smaller the distance the more horizontal the cooking vessel handle support mechanism 4 is supported while as the distance is increased the cooking vessel handle support mechanism 4 is disposed at a greater downwardly disposed angle. The more the rotational torque of the cooking vessel handle support mechanism 4 is increased by the forces of gravity created by the weight of the cantilevered cooking vessel and the added food products, the more the frictional engagement will be encouraged between the outer surface 48A of the rigidly mounted friction pin 48, which is an extension of the support pin 45 and the narrower surface 1D of the upright member 1 and the end surface 51B of the cooking vessel surface angle adjustment device 51 with the narrower surface 1C of the upright member 1, thus creating a secondary, and progressively more forceful locking mechanism, between the cooking vessel handle support mechanism 4 and the upright member 1 of the invention shown. Still referring to FIG. 13, FIG. 15, FIG. 17 and FIG. 18, the distance between the inner surface 48A of the rigidly mounted section 48 of the pin 45 and the end surface 51B of the cooking vessel surface angle adjustment device 51 determines the angle between the horizontal plane in relation to the hearth and a line created by connecting the frictional contact point 5AA of the cooking vessel handle resting against the frictional contact point 44A along the underside of support pin 44, as shown in FIG. 18, and the frictional contact point 5AB of the cooking vessel handle resting against the frictional contact point 45A along the upper surface of support pin 45. The distance between contact point 51B and contact point 48A can be changed, as shown in FIG. 13, FIG. 15 and FIG. 17, by rotating the cooking vessel surface angle adjustment device 51 clockwise or counterclockwise within its threaded confinement 43A to either advance or retract the end surface friction point 51B, thereby engaging surface 1C of the upright member 1 at different points along upright member 1. With the changing of this angle, the oblique plane of the cooking vessel's cooking surface can be adjusted to a horizontally level plane in relation to the hearth which positioning is desirable for the purpose of cooking and preventing the food from rolling off the cooking surface. FIG. 20 shows such oblique planes. As shown in FIG. 4, the support pins 44 and 45 are constructed of such a length that the cook can easily move the entire cooking vessel laterally transversely from side to side and front to back. FIG. 19 shows the cooking vessel handle supported by the support pins in different lateral positions. Although the present invention has been described with reference to particular embodiments, it will be apparent to those skilled in the art that variations and modifications can be substituted therefore without departing from the principles and spirit of the invention.

I claim:

1. A cooking utensil support apparatus for supporting a cooking utensil in a substantially horizontal plane for cooking food over a heat source, said cooking utensil having a handle, comprising:
    a stand having a top and a bottom, said stand including:
        an upright member having a top, a bottom, a height, first and second sides and first and second ends, said first and second sides disposed substantially parallel to one another; and
        a first support foot and a second support foot both attached to said bottom of said upright member for holding said upright member in an upright position; and
    a cooking utensil handle support member adjustably positioned in height on said upright member, said cooking utensil handle support member including:
        tightening means for affixing said cooking utensil handle support member at a selected height on said upright member,
        angle adjustment means for adjusting the angle of said cooking utensil handle support member on said upright member;
        first and second support pins each having an end, said first and second support pins extending from said cooking utensil handle support member, said first and second pins horizontally disposed and positioned substantially parallel to one another, said first and second support pins for receipt of said handle under said first support pin and above said second support pin for frictionally engaging and suspending said handle in a cantilever fashion
    wherein said cooking utensil handle support member is formed in a substantially U-shaped structure having a base, and first and second sides and wherein:
    said angle adjustment means adjustably extends through said base and contacts said first end of said upright member;
    said tightening means extends through said first side of said cooking utensil handle support member for tightening said cooking utensil handle support member against said upright member; and
    said first and second support pins extend from said second side of said cooking utensil handle support member.

2. The apparatus of claim 1 further including:
    a threaded first side aperture defined in said first side of said cooking utensil handle support member; and wherein said tightening means includes a threaded locking screw engaged within said threaded first side aperture and tightenable against said upright member.

3. The apparatus of claim 1 wherein said angle adjustment means further includes:
    a threaded base aperture defined in said base of said cooking utensil handle support member; and
    a threaded pivot adjustment screw having an end, said pivot adjustment screw engaged within said threaded base aperture for adjusting said angle of said cooking utensil handle support member to said upright member.

4. The apparatus of claim 3 wherein said cooking utensil handle is adjustable from front to rear and from side to side at selected angles within said cooking utensil handle support member for optimum positioning of said cooking utensil over said heat source.

5. The apparatus of claim 3 wherein said angle adjustment means provides angular adjustment of said cooking utensil handle support member for the pivoting of said cooking utensil handle support member on said upright member through a range of angles as said threaded pivot adjustment screw is either advanced or retracted by rotation through said base of said cooking utensil handle support member to a desired angle for disposing said cooking utensil at a desired position over said heat source.

6. The apparatus of claim 5 wherein said second support foot is rotatably attached to said first support foot for positioning said first support foot and said second support foot at an angle to one another of less than 180 degrees.

7. The apparatus of claim 6 wherein said end of said first support pin bends downward and said end of said second support pin bends upward for retaining said handle therebetween.

8. The apparatus of claim 6 wherein said upright member has a lower portion and is integrally formed with said first support foot at an angle of approximately 90 degrees forming a substantially L-shape and wherein said lower portion of said upright member is twisted at an angle of approximately 45 degrees.

9. The apparatus of claim 1 wherein said tightening means includes a spring-loaded locking mechanism disposed on said first side of said cooking utensil handle support member, said spring-loaded locking mechanism having a friction pin extending through an aperture defined in said first side of said cooking utensil handle support member for said friction pin to contact said first side of said upright member, said spring-loaded locking mechanism to exert pressure through said friction pin against said upright member for retaining said cooking utensil handle support member at said selected height.

10. The apparatus of claim 9 wherein:
said spring-loaded tightening means further includes a bent lever bar;
said bent lever bar has first and second ends; said first end being attached to said first side of said cooking utensil handle support member by a compression spring attached to said first side of said cooking utensil handle support member;
said friction pin extends from said first end of said bent lever bar through said aperture in said first side of said cooking utensil handle support member; and
said compression spring having sufficient force to urge said bent lever bar to push said friction pin against said upright member to hold said cooking utensil handle support member in place at said selected height on said upright member, said sufficient force being releasable by the exertion of manual pressure on said second end of said bent lever bar for positioning of said cooking utensil handle support member at said selected height on said upright member.

* * * * *